United States Patent
Lindheimer et al.

(10) Patent No.: US 12,058,776 B2
(45) Date of Patent: Aug. 6, 2024

(54) METHODS, APPARATUS AND COMPUTER-READABLE MEDIUMS RELATING TO CAPABILITY REPORTING IN A WIRELESS NETWORK

(71) Applicant: Telefonaktiebolaget LM Ericsson (publ), Stockholm (SE)

(72) Inventors: Christofer Lindheimer, Vadstena (SE); Mikael Wass, Sätila (SE); Ylva Timner, Luleå (SE); Alessio Terzani, Stockholm (SE); Malik Wahaj Arshad, Stockholm (SE); Paul Schliwa-Bertling, Ljungsbro (SE); Henning Wiemann, Aachen (DE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 17/428,765

(22) PCT Filed: Feb. 13, 2020

(86) PCT No.: PCT/SE2020/050163
§ 371 (c)(1),
(2) Date: Aug. 5, 2021

(87) PCT Pub. No.: WO2020/167235
PCT Pub. Date: Aug. 20, 2020

(65) Prior Publication Data
US 2022/0007176 A1 Jan. 6, 2022

Related U.S. Application Data

(60) Provisional application No. 62/842,076, filed on May 2, 2019, provisional application No. 62/825,190, filed
(Continued)

(51) Int. Cl.
*H04W 8/24* (2009.01)
*G06F 16/22* (2019.01)
(Continued)

(52) U.S. Cl.
CPC .......... *H04W 8/24* (2013.01); *G06F 16/2255* (2019.01); *H04W 12/106* (2021.01); *H04W 24/04* (2013.01)

(58) Field of Classification Search
CPC ...... H04W 8/24; H04W 12/106; H04W 24/04
See application file for complete search history.

(56) References Cited

U.S. PATENT DOCUMENTS

2009/0158435 A1* 6/2009 Milliken ............... H04L 63/145
726/13
2018/0227904 A1* 8/2018 Raghunathan ........ H04W 72/51
(Continued)

FOREIGN PATENT DOCUMENTS

| CN | 105191171 A | 12/2015 |
|---|---|---|
| EP | 2364051 A1 | 9/2011 |

(Continued)

OTHER PUBLICATIONS

PCT International Search Report and Written Opinion, mailed May 19, 2020, for International Application No. PCT/SE2020/050163, 15 pages.
(Continued)

*Primary Examiner* — Barry W Taylor
(74) *Attorney, Agent, or Firm* — Sage Patent Group

(57) ABSTRACT

The disclosure provides a method performed by a wireless device for providing capability information. The method comprises: receiving a first message from a base station, the first message comprising an indication of a capability filter; utilizing the capability filter to generate a filtered set of capabilities of the wireless device; applying a hash function
(Continued)

to the filtered set of capabilities to generate a hash value; and transmitting a second message to the base station, the second message comprising the hash value.

19 Claims, 22 Drawing Sheets

Related U.S. Application Data on Mar. 28, 2019, provisional application No. 62/813,999, filed on Mar. 5, 2019, provisional application No. 62/805,567, filed on Feb. 14, 2019.

(51) Int. Cl.
*H04W 12/106* (2021.01)
*H04W 24/04* (2009.01)

(56) References Cited

U.S. PATENT DOCUMENTS

| | | | |
|---|---|---|---|
| 2019/0363843 A1* | 11/2019 | Gordaychik | H04L 1/08 |
| 2020/0107197 A1* | 4/2020 | Kaushik | H04W 88/08 |
| 2020/0137744 A1* | 4/2020 | Shikari | H04L 5/0032 |
| 2020/0145211 A1* | 5/2020 | Lee | H04L 9/0825 |
| 2021/0160685 A1* | 5/2021 | Ke | H04W 8/22 |
| 2022/0078605 A1* | 3/2022 | Alnås | H04W 8/24 |
| 2022/0394683 A1* | 12/2022 | Palenius | H04W 48/20 |

FOREIGN PATENT DOCUMENTS

| | | |
|---|---|---|
| WO | 2018144421 A1 | 8/2018 |
| WO | 2020145861 A1 | 7/2020 |

OTHER PUBLICATIONS

3GPP; Technical Specification Group Services and System Aspects;Study on optimisations of UE radio capability signalling (Release 16); 3GPP TR 23.743 V1.1.0 (Jan. 2019); Valbonne France; 55 pages.

3GPP; Technical Specification Group Services and System Aspects;System Architecture for the 5G System;Stage 2 (Release 15); 3GPP TS 23.501 V15.4.0 (Dec. 2018); Valbonne France; 236 pages.

3GPP; Technical Specification Group Radio Access Network; NG-RAN; NG Application Protocol (NGAP) (Release 15); 3GPP TS 38.413 V15.2.0 (Dec. 2018); Valbonne France; 308 pages.

3GPP; Technical Specification Group Radio Access Network; NR; Radio Resource Control (RRC) protocol specification (Release 15); 3GPP TS 38.331 V15.4.0 (Dec. 2018); Valbonne France; 474 pages.

3GPP; Ericsson, Aspects on HASH-based Capability IDs; 3GPP TSG-RAN WG2 #105; Athens, Greece, Feb. 25-Mar. 1, 2019; Tdoc R2-1900644; 4 pages.

T-Mobile USA Inc, Proposed hybrid solution using Vendor capability ID with a HASH; SA WG2 Meeting #129bis; Nov. 26-30, 2018, West Palm Beach, USA; S2-1812049; 7 pages.

3GPP; Ericsson, Capability ID based on early filter information; 3GPP TSG-RAN WG2 #105-Bis; Xi'an, China, Apr. 8-12, 2019; Tdoc R2-1903993; 6 pages.

Extended European Search Report for European Patent Application No. 20755154.0 mailed Oct. 13, 2022, 15 pages.

Ericsson et al., "Alternative Capability ID Based on Early Filter Information", 3GPP SA WG2 Meeting #132, S2-1903179, Xi'An, P.R.China, Apr. 8-12, 2019, 5 pages.

Office Action mailed Jan. 16, 2024 for Chinese Patent Application No. 202080014580.3, 13 pages (includes English translation).

* cited by examiner

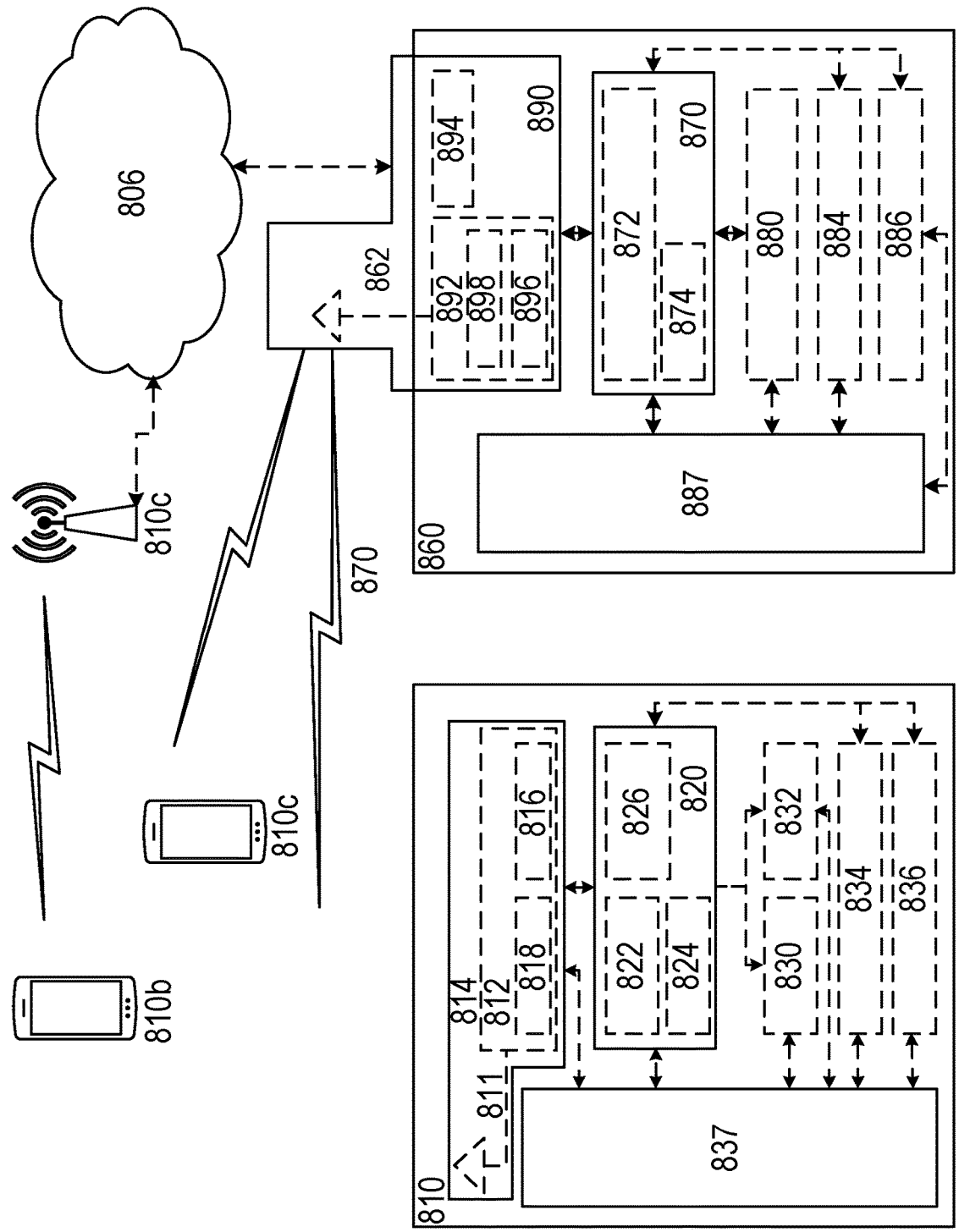

METHODS, APPARATUS AND COMPUTER-READABLE MEDIUMS RELATING TO CAPABILITY REPORTING IN A WIRELESS NETWORK

CROSS-REFERENCE TO RELATED APPLICATIONS

This application is a 35 U.S.C. § 371 national stage application for International Application No. PCT/SE2020/050163, entitled "METHODS, APPARATUS AND COMPUTER-READABLE MEDIUMS RELATING TO CAPABILITY REPORTING IN A WIRELESS NETWORK", filed on Feb. 13, 2020, which claims priority to U.S. Provisional Patent Application No. 62/805,567, filed on Feb. 14, 2019, to U.S. Provisional Patent Application No. 62/813,999, filed on Mar. 5, 2019, to U.S. Provisional Patent Application No. 62/825,190, filed on Mar. 28, 2019, and to U.S. Provisional Patent Application No. 62/842,076, filed on May 2, 2019, the disclosures and contents of which are hereby incorporated by reference in their entireties.

TECHNICAL FIELD

Embodiments of the disclosure relate to wireless communications, and particularly to methods, apparatus and computer-readable mediums for capability reporting in wireless networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There can be different types of UEs in a communications network. 3GPP standardizes different standards for wireless communication, e.g., known as GSM, WCDMA, LTE and now also NR, the new generation commonly referred to as "5G". These different abbreviations are really denotations of different radio access technologies. UEs operating in these networks can be capable of communicating using one of these technologies/generations, or they may support several. Similarly, there are many different frequencies that are being used for wireless communication and some UEs may support communication on some frequency bands whereas other UEs may support communication on other frequency bands. Also, for each frequency band, there may be different levels of complexity in supporting, e.g., different amounts of input/output streams, e.g., MIMO streams and this can mean that to properly describe what functionality a UE can support in a specific moment can be quite complex and large information.

In 3GPP, a UE informs the network about its communication capabilities. It does this such that the network will have information available on how best to configure communication paths or connections between the UE and the network. These connections can for example be communicated to the radio access nodes, i.e., in 3GPP known as gNB for NR/5G, eNB for LTE/EUTRA, etc. With the information available in the RAN nodes, it would be possible to know which features to turn on and activate, which features not to activate, on what frequencies, etc. However, adding more and more features and supporting more and more frequencies in the standard have resulted in the UE Radio Capabilities specified by 3GPP increasing in size, making it very costly in terms of network resource usage as well as processing in both the UE and the nodes when the capabilities need to be transferred between relevant network entities, e.g. between UE AMF and NG-RAN.

In some situations it is even the case that it is not really possible to transfer all capabilities any longer, as the amount of information is so large.

By improving this situation, it may be possible to reduce: interface signaling, processing in the nodes and memory usage.

On the other hand, there is a need to be able to transfer the information at all, e.g., there is a need also for protocol improvements.

One way to transfer capability information in NR is via an enquiry-information procedure between the UE and the NG RAN node. This procedure is described in more detail in 3GPP TS 38.331, v 15.4.0 and copied below:

UE Capability Transfer 5.6.1.1 General

This clause describes how the UE compiles and transfers its UE capability information upon receiving a UECapabilityEnquiry from the network. FIG. 1 shows UE capability transfer.

5.6.1.2 Initiation

The network initiates the procedure to a UE in RRC_CONNECTED when it needs (additional) UE radio access capability information.

The UE receives the UECapabilityEnquiry and will then determine what information that is requested. This can be referred to as a "filter" as it actually indicates to the UE, from all possible capabilities, that it should filter out a certain set and transmit that set to the network. It does so by reading a ue-CapabilityRAT-RequestList indicating what radio access technologies that the gNB request information for. This can include different indications, e.g., that the UE should provide information about NR capabilities, E-UTRA capabilities or even situations for when the UE may be simultaneously connected to both radio accesses.

For each access/RAT type, the UE shall include information about supported band combinations, features and feature combinations. The UE shall ensure that the feature set IDs and feature set combination IDs are consistent across feature sets, feature set combinations and band combinations in all UE capability containers (per RAT) that the network queries with the same FreqBandList and with the same eutra-nr-only flag (where applicable).

It is currently stated that if the UE cannot include all feature sets and feature set combinations due to message size or list size constraints, it is up to UE implementation which feature sets and feature set combinations it prioritizes.

The UE shall compile a list of "candidate band combinations" consisting of bands included in FreqBandList, and prioritized in the order of FreqBandList (i.e. first include band combinations containing the first-listed band, then include remaining band combinations containing the second-listed band, and so on).

It can be seen from this that the procedure to send capability information is both complex and generates a lot of information.

The procedure above describes the sequence for transmitting capability information between UE and gNB. Typically this information is stored together with other information in the NG-RAN node for as long as the UE is connected to the NG RAN node, or it is in RRC_INACTIVE. This capability information can also be stored in the context in the AMF (i.e., the information about a specific UE that is registered or attached to the network). In that case, the capabilities are transferred over the NGAP/N2 interface for storing in AMF. The procedure for this is called UE radio capability info indication and is described in 3GPP TS 38.413, v 15.2.0, as follows:

The purpose of the UE Radio Capability Info Indication procedure is to enable the NG-RAN node to provide to the AMF UE radio capability-related information. The procedure uses UE-associated signalling. FIG. 2 shows transmission of UE radio capability information.

8.14.1.2 Successful Operation

The NG-RAN node controlling a UE-associated logical NG connection initiates the procedure by sending a UE RADIO CAPABILITY INFO INDICATION message to the AMF including the UE radio capability information.

The UE RADIO CAPABILITY INFO INDICATION message may also include paging specific UE radio capability information within the UE Radio Capability for Paging IE.

The UE radio capability information received by the AMF shall replace previously stored corresponding UE radio capability information in the AMF for the UE, as described in TS 23.501.

In 3GPP, TR 23.743, v.1.1.0, there are described various solutions for how to transfer, instead of complete capability information, a capability ID from the UE to the network. The capability ID should then map to a specific capability information set. If the mapping between capability ID and the actual capability information is available on the network side, then the cost of transmitting can be decreased in that the ID can be made a lot smaller than the actual information. What this targets is thus a representation of the capability information that the UE shall transmit.

Generally the ideas are based on the network nodes and the UE having the same mapping of what capability information is mapped to which capability ID.

The advantages of this are that it can be more efficient to signal. If the capabilities are associated and stored with each UE, it would be more efficient to just store an ID than the full information for all UEs. The information would then only need to be stored in a mapping table once. This would save memory. Similarly, to parse capability information in the nodes is a costly process from a processing perspective and to produce, subsequent to this, a configuration of all possible configurations will also add to processing. If it would be possible to map certain pre-configured configurations and have already a set of parsed capabilities at hand and map to an ID, this would mean great advantages to processing as well.

Two examples of capability IDs are, according to TS 23.743, v 1.1.0;

Manufacturer-specific: The UE Capability ID may be assigned by the UE manufacturer in which case it is accompanied with the UE manufacturer information (e.g. TAC field in the PEI). In this case, the UE Capability ID uniquely identifies a set of UE Radio Capabilities for this manufacturer, and together with this UE manufacturer information uniquely identify this set of UE Radio Capabilities in any PLMN;

PLMN-specific: If a manufacturer-assigned UE Capability ID is not used by the UE or the serving network, or it is not recognised by the serving network, the serving core network may allocate UE Capability IDs for the UE corresponding to different sets of UE Radio capabilities the PLMN may receive at different times from the UE. In this case, the UE Capability IDs the UE receives are applicable to the serving PLMN and uniquely identify the corresponding sets of UE Radio Capabilities in this PLMN;

For these two examples, it is agreed that a number of rules or principles shall apply (selected copying from 3GPP TS 23.743, v 1.1.0)

If a UE capability ID is assigned by a PLMN when a UE capability filter is used, then the UE capability ID is related to the Capability Filter.

The network or the Manufacturer shall be able to change the UE Capability ID associated with a device, e.g., due to a SW upgrade enabling new UE Radio Capabilities on the device side (for the manufacturer assigned UE Capability ID) in the network side At any given instant the UE has only one UE capability ID that is indicated to the network.

The mapping between a specific capability ID and a corresponding set of capabilities does not change once set.

For key issue #2 the following principles are agreed:—
Owing to the need to support UE Radio Access Capabilities >65 536 bytes (i.e. >524 288 bits), and the need to support fast, reliable, low processing complexity mechanisms for frequently used procedures (at least Service Request, RRC Connection Resume, X2&Xn handover, secondary gNB addition), the full UE Radio Access Capabilities shall not normally be transferred as part of those procedures. This requires that the serving and target RAN store a local copy of the mapping between the UE Capability IDs and the full UE Radio Access Capabilities for the UEs that frequently use that RAN node.

if a UE capability ID assigned by PLMN is the result of the UE signalling a set of capabilities related to a UE capability filter provided by the network, the UE capability ID is stored always alongside (a reference to) the filter which was used when the capabilities associated to the ID were signalled.

AMF that supports the RACS feature is mandated to have access to full set of UEs radio capabilities and the mapping between UE Capability ID and corresponding UE radio capabilities for at least the UEs registered in this AMF;

NG-RAN that supports RACS, is mandatory to be able to maintain local storage of UE radio capabilities and have access to the mapping between the UE Capability ID and the full set of UEs radio capabilities;

A specific NG-RAN node that does not have the mapping between a specific UE Capability ID and the corresponding UE radio capabilities, shall be able to retrieve the mapping from CN.

The serving AMF stores the UE Capability ID in the UE context if received and provides the capability ID to NG-RAN via N2 message, e.g. INITIAL CONTEXT SETUP REQUEST.

For UEs that are already assigned with an applicable UE Capability ID, it is mandatory to signal the UE Capability ID in Initial Registration. If both PLMN assigned and manufacturer assigned UE Capability IDs are available, the UE shall signal the PLMN assigned UE Capability ID;

To allow for a mix of upgraded and non-upgraded RAN nodes over the X2/Xn interfaces, the UE Capability ID should be included in the Path Switch signalling between MME/AMF and RAN.

For backwards compatibility between nodes that support the feature and nodes that do not support the feature, if a peer node is not supporting RACS, the source node attempts to send to the peer node the UE capabilities that map to the UE capability ID. However, owing to message size limits, this may lead to an inter-CN node handover systematically failing, or, requiring the retrieval of the UE capabilities across the target RAN node's radio interface.

When a UE capability ID is associated to a UE capability filter, the association to this filter is conveyed over the signalling interfaces when a mapping between the UE capability ID and the UE capabilities is provided. This includes the interface between the UE and the Network.

In addition to the above, more methods for providing a capability ID are described. For example, one ID is based on performing a hash operation on the capability information. This is described as:

The UE calculates a HASH value of the UE Radio Capabilities and sends the HASH value to network and the network will determine if corresponding UE Radio Capabilities are already available. If the corresponding UE Radio Capabilities are not available then they need to be retrieved from the UE. When the network receives the UE Radio Capabilities, the RAN needs to calculate the HASH value in order to validate that the HASH value corresponds to the uploaded UE Radio Capabilities before accepting them.

Two options are described;

Option 1: With the assumption that each subset of UE Radio Capabilities is calculated with SHA-256 the probability is very low that two different UE Radio Capabilities have the same hash value so we do not specify any solution for that.

Option 2: The UE Capability ID is extended to also include a device manufacturer unique identifier, this could for example be the same as proposed in solution #1 to use the TAC code. The UE vendor also needs to ensure that the two different UE Radio Capabilities do not have the same HASH value by re-arranging the order of the individual UE Radio Capabilities to ensure a unique hash.

SUMMARY

There currently exist certain challenge(s).

With respect to the HASH-based capability ID in particular, it has some good advantages in that if there is a hash created over the capability information, then there is no need for a UE to "keep track of" or administer any capability IDs. The capability ID is simply created with the relevant capability information and it is not even necessary for a UE to remember the ID, as it can be created again and again, using the same hash algorithm.

In a sense, this is a very attractive aspect of the hash-based ID. The UE need only implement a hash function and the level of administration would be minimal.

Assuming that the capability ID should first be sent to the network in a NAS message, this method requires that the Capability ID be calculated right after the RRC connection setup procedure. However, at that point in the sequence the gNB has not sent any capability enquiry indicating in what manner that information should be filtered, and thus it is not clear what capability information to actually do the hash over. The capability information that is relevant to the specific gNB accessed should be used, but at this point there is no such knowledge in the UE as there has not been any enquiry/information procedure yet.

In addition, if the same UE would create different IDs based on different filters received from the gNB in capability enquiries, that UE would have similar challenges as those for a PLMN-assigned ID to know what HASH ID (of the several) to send over NAS signalling, since it would not know what filter a new gNB would want.

The UE may have previously calculated and possibly even stored a set of capability IDs, e.g., as an example, Hash for capabilities including frequency A-B-C-D
Hash for capabilities including frequency A-B-C
Hash for capabilities including frequency A-B-D But it is not possible to know, for the UE, in advance of an enquiry what a certain gNB would want the UE to filter and thus what capability ID should be sent.

So, one problem with the hash solution is that to create an ID a filter from the enquiry message would be needed and then it is not possible to send the ID in the initial NAS message, which may sometimes be desired.

Due to the above limitations, it is difficult to benefit from the advantages possible with a hash, e.g., in book-keeping and administrative advantages. To generate an ID, there is a need for a filter, for an actual request of capability information.

It may be possible to create a hash using "full capability information" and this would indeed work in the UE side, but since this "full capability information" cannot be signalled it would not be possible to re-create the same ID, i.e., to validate the ID on the network side. In this scenario, the hash method has basically no advantages and in any case databases in the networks would need to be preconfigured with mapping information.

Certain aspects of the present disclosure and their embodiments may provide solutions to these or other challenges.

In one aspect of the present disclosure, a hash-based capability ID is created in a UE, using a capability filter similar to what is included in the UEcapabilityEnquiry message. This filter should form the basis for what capability information to perform a hash over.

The filter to use to create the hash-based-capability ID is included, in one embodiment, in broadcast information in the cell the UE wants to access. By reading the broadcast information and detecting/interpreting the filter, the UE will be able to generate a capability ID prior to transmission of its first NAS message and certainly prior to any enquiry message reception from the gNB. This means that the UE has a hash-based ID to include in early signaling. One benefit of generating the ID based on a hash is that it significantly reduces the administration related to IDs. By having a hash and capability information it will always be possible to create the ID and the ID will be possible to verify by requesting the capability information the hash was used on in the enquiry-information procedure.

In broadcasting a filter, it becomes possible to use a hash for calculating a Capability ID that is relevant and will reflect the relevant capability information to the network.

In another aspect of the present disclosure, different base stations may have different filters and thus a UE will create different capability IDs based on these different filters. It may be beneficial to store a filter-to-capability ID mapping in the UE to avoid the need to create capability information based on a filter every time it is needed then perform the hash and send the capability ID. If a UE has stored the capability ID and filter mapping, it can do this action with much less processing.

According to another aspect of the disclosure (and in contrast to the above) one of the advantages with using the hash may be that the UE isn't required to store and administer any ID; it can in fact generate a hash on capability information for any filter that is broadcast.

Thus, a UE will never have to remember any capability ID between different attach/registration events, as it can always create a new hash based on the broadcasted filter.

In another aspect of the present disclosure, the hash created over the filter (e.g., as acquired from broadcast information) is sent as a full identifier according to option 1, i.e., without any additional fields.

According to another aspect of the present disclosure, the hash created with the capability information indicated by the filter from broadcast is a hash-part in a capability ID that also includes another portion, for example a type allocation code (TAC), or any other identifier allocated for use by the UE vendor.

In this sense, in one aspect of the disclosure, the capability ID is only related to the actual capability information and in another aspect of the disclosure, the capability ID is also associated with the UE type.

In another aspect of the present disclosure, a filter is sent to a specific UE, not via broadcast but in a dedicated message. In accordance with 3GPP NR standards, for example, a connection to the network starts with a setup request for a signaling connection from the UE to the gNB, e.g., an RRC Setup Request. This is usually referred to as "msg3" as in message 3, since this message is preceded by two more messages targeting resource setup for this message (e.g., a random access preamble and a random access response). In message 4, msg4, the network will respond to the UE with information from the network on how to proceed. This is generally referred to as a setup message. This is followed by a message 5 from the UE, "setup complete". According to this particular embodiment of the present disclosure, the filter to be used to transfer the capability ID is transferred not via broadcast, but rather in the setup message, or msg4. This message is sent early in any communication, such that the UE will have available and also have time to process its capability information and capability ID prior to when it is needed, or needs to be transmitted in subsequent messages.

In another aspect of the present disclosure, and according to embodiments where the capability filter is transferred using msg4, the network may selectively include a filter description in msg4. In msg3, a UE identifies itself using one of two IDs: either a Temporary Mobile Subscriber Identity (TMSI), for 5G referred to as 5G-S-TMSI, or, in case the UE does not have a valid 5G-S-TMSI value assigned, a random sequence. Whenever a UE identifies itself with a random sequence, this is an indication to the radio network and gNB that the UE is not registered with any AMF and thus the UE needs to transfer capability information in a subsequent communication. Thus, according to one aspect of the present disclosure, whenever the UE includes a random sequence as identification in msg3, rather than a TMSI, then the network responds in msg4 with a setup message including a capability filter that the UE may use to calculate a capability ID and transfer in subsequent communication.

According to another aspect of the present disclosure, and to address collisions (e.g., when identical hash values are generated for different sets of capability information), the hash operation may be performed over an additional parameter (i.e., in addition to the set of capabilities defined by the filter), to allow for different results when performing a hash operation. This additional parameter may thus allow addressing hash collisions of, e.g., very common UEs in combination with very common filters. This addition of an additional parameter does not necessarily change the collision probability, but it allows for moving a problem away from a specific filter and a specific UE capability information set.

According to another aspect of the present disclosure a collision detection mechanism for capability IDs is described. According to the collision detection mechanism, a faulty configuration triggers a re-request for capability information and ID. If a comparison between the re-requested capability ID and a database of stored capability IDs reveals an identical ID but a non-identical capability information for the same filter, a collision is detected. According to one aspect of the present disclosure, gNB will instruct the UE to include an additional parameter as input to the hash operation (e.g., in broadcast filter information, or the dedicated signaling as described above, i.e., msg4 signaling), such that the UE will create a different hash where collision probabilities are moved away from this combination.

According to an alternative aspect of the present disclosure, two different capability containers are stored together with the ID in a mapping table when a collision is detected. Whenever this capability ID is used again, the AMF will provide both information containers and possibly an explicit indication to the gNB that the capability ID is not unique. Then, the UE will need to re-request explicit information from UEs that generate the capability ID that is similar to another generated ID.

According to another aspect of the present disclosure, the storage of mapping between capability ID and capability information in the network is flushed regularly. The reason for this is that even though capability ID collisions may be detected if reconfigurations fail, they will not be detected otherwise. This may result in advanced UEs that are capable of, e.g., very high data rates, may never be configured with such high data rates if they have a capability ID that is the same as a less advanced UE. If the mapping tables are flushed from time to time, or flushed in sequence, in particular for IDs that are commonly signaled, then it is much less likely that such a problem will occur. A random or repetitive request of capability information also for IDs for which the nodes have already stored information may also reveal a collision of hash values and can be done, e.g., regularly or irregularly and also dependent on ID type used. The frequency with which a particular capability ID or hash is checked or flushed may vary as a function of the frequency of use of that capability ID or hash. For example, if an ID is used relatively often, it can be checked relatively often (and vice versa).

In a further embodiment, the flushing of capability IDs and corresponding capability information from the mapping table may occur in conjunction with a change to the additional parameter used as an input to the hash operation (e.g., in broadcast filter information, or in dedicated signaling such as msg4 or a request for the UE capability). Thus, upon detection of a collision between identical capability IDs but non-identical capability information, one or both of the colliding UEs (or all UEs in a given cell) may be instructed to use a different additional parameter in the hash operation used to calculate the capability IDs. In this way, once a collision has occurred between identical capability IDs, similar collisions are made much less likely through the change to the additional parameter.

In a yet further aspect, UEs may be instructed (e.g., by the gNB) to utilize a different hash length (e.g., a number of bits) when calculating the capability ID to avoid collisions between identical capability IDs and non-identical capability information. For example, an indication of the hash length may be communicated to UEs in broadcast information or via dedicated signaling such as msg4 or a request for the UE capability. This aspect may be performed responsive to one or more collisions being detected between identical capability IDs and non-identical capability information. For example, the hash length may be increased upon detecting a collision, or a certain number of collisions within a given time window.

There are, proposed herein, various embodiments which address one or more of the issues disclosed herein.

Certain embodiments may provide one or more of the following technical advantage(s). One advantage of embodiments of the disclosure is that the preferences of a specific gNB will render a filter that will determine a capability Identifier. This means that the identifier used in a specific gNB, will most likely be the relevant filter and the relevant ID for the specific gNB. The situation when a gNB may associate an ID with a filter that was relevant for another gNB is not a huge risk, as it may have been, e.g., with other ID approaches.

BRIEF DESCRIPTION OF THE DRAWINGS

FIG. 8 shows a wireless network according to embodiments of the disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Aspects of the disclosure will now be described with embodiments from the new 5GS standard, the system and architecture for 5G and various state machines are described.

One "state machine" is the connection management state model or CM-state model, described in 3GPP TS 23.501, v 15.4.0.

Generally, connection management comprises of functions for establishing and releasing signaling connections between UE and core network node, for 5G this node is called AMF (Access and Mobility Management Function).

Figure 3:
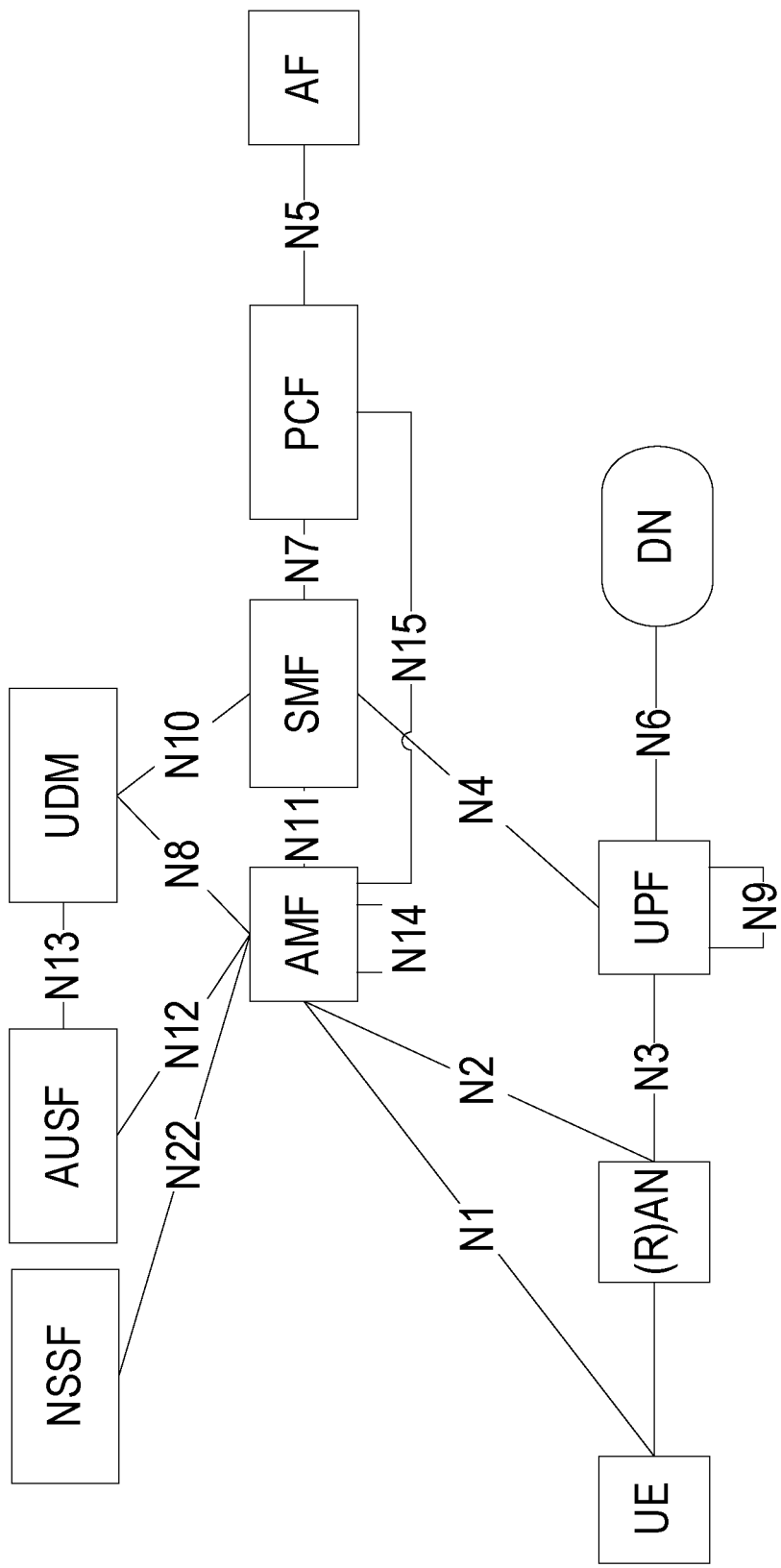
FIG. 3 shows a 5G system architecture.

FIG. 3 illustrates an example of a 5G system architecture, including nodes (e.g., AMF, UE, (R)AN) and interface names. Connection management is about signaling connection over the N1 interface. It will be understood by those skilled in the art that the UE may correspond to the wireless device 810 or the UE 900 described below, while the (R)AN may correspond to the network node 860 described below.

This signaling connection over N1 is used to enable Non-Access-Stratum (NAS) signaling exchange between the UE and the core network. It comprises both the AN signaling connection between the UE and the AN (Access Node) and the N2 connection, between the AN and the AMF.

There are two CM-states defined, CM-IDLE and CM-CONNECTED.

A UE in CM-IDLE has no NAS signaling connection established over N1 to the AMF whereas if it is in CM-CONNECTED, there is a signaling connection.

In a similar way as in the AMF, there is also a state model in the AN, the access network.

Hereinafter, the term "gNB" may be used for the access network node. However, those skilled in the art will appreciate that the disclosure is not limited to 5G or NR, but instead may be applicable to any radio access technology or system. Thus the access network node may alternatively be a base station, an access point, an eNB, etc. The access network node is defined further below with respect to FIG. 8 (see network node 860).

Figure 4:
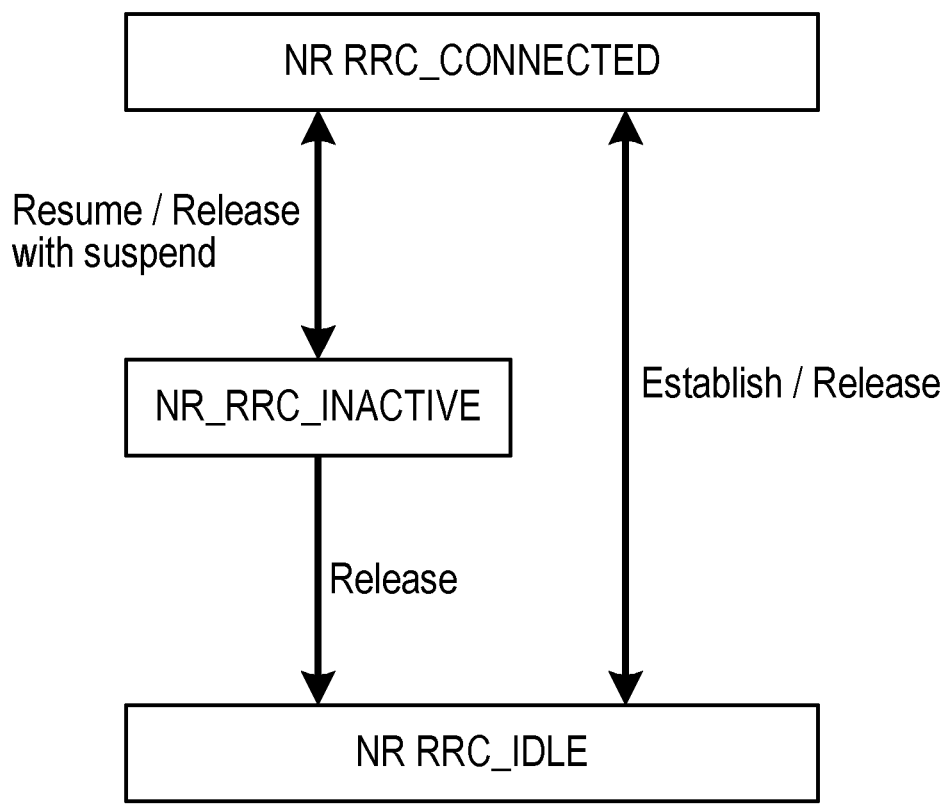
FIG. 4 shows an RRC state machine.

One state model in the gNB is the RRC State machine, shown in FIG. 4 for NR.

A UE can either be in RRC_CONNECTED, RRC_INACTIVE or RRC_IDLE.

FIG. 4 is an illustration of how the RRC State machine is intended to work and the messages used to trigger/transition a UE between the states. The figure also shows the principles for transition.

The mapping between the different state machines, the one in the AN and the one in AMF, is such that CM-CONNECTED can map to either RRC_CONNECTED or RRC_INACTIVE—while CM-IDLE always map to RRC_IDLE.

A UE is either in RRC_CONNECTED state or in RRC_INACTIVE state when an RRC connection has been established. If this is not the case, i.e. no RRC connection is established, the UE is in RRC_IDLE state. These different states are further described in 3GPP TS 38.331, v 15.4.0.

When, for example, a UE registers with the network a signaling sequence takes place that starts with the UE sending an RRC setup request/establishment request to an NG-RAN node. This request is sent to establish a signaling connection that would allow transmission of control messages, both to RAN, but also messages that go to a core network node, such as an AMF. In example embodiments of the present disclosure, the main interfaces involved are;
1. The interface between the AMF and the NG RAN node (e.g, gNB, ng-eNB). This is referred to as the NGAP or N2 interface.
2. The interface between the AMF and the UE. This is referred to as the N1 interface. Sometimes the term NAS signaling will be mentioned. This refers to signaling that is sent on the N1 interface, i.e., it is not decoded or interpreted by the NG-RAN node even though the RAN node is involved in forwarding the NAS messages.
3. The interface between the NG-RAN node and the UE. This is referred to as the Uu interface and the relevant signaling protocol over this interface is the RRC, the Radio Resource Control Protocol.

Turning now to the signaling, mainly between these nodes, in connection to an initial registration scenario.

Figure 5A:
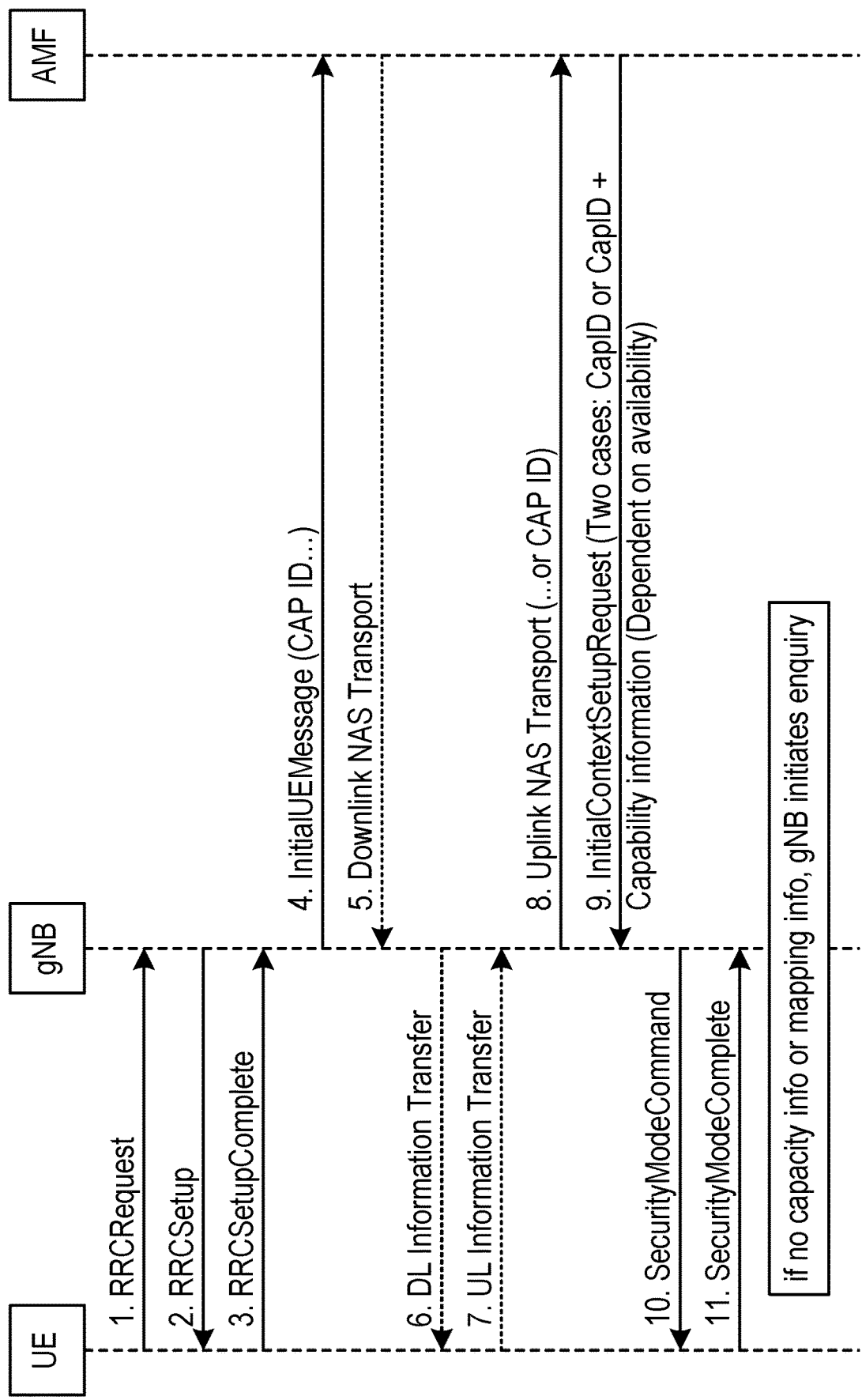
FIGS. 5a and 5b show a signalling diagram showing a network registration procedure according to embodiments of the disclosure.
Figure 5B:
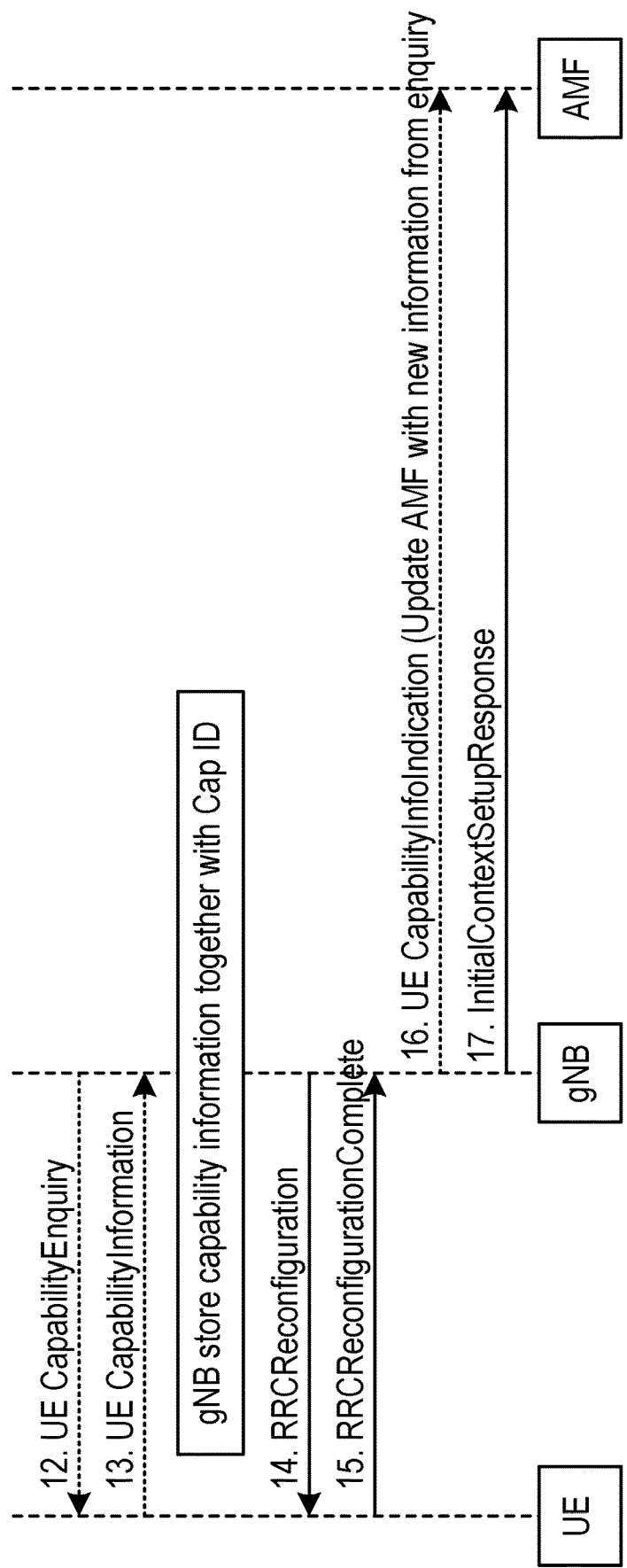

While there can be variations to the sequence of signaling and different radio access technologies have different naming conventions on the signals, FIGS. 5a and 5b show an example of one use of a capability ID, and particularly illustrate a signaling diagram showing a network registration procedure according to embodiments of the disclosure.

The signaling starts between UE and gNB, with setup of an RRC connection. Step 1-3 in FIG. 5a illustrate this. The setup complete message may include a piggybacked NAS message, or alternatively, the NAS transport in the uplink may happen after some information exchange between the gNB and the AMF after having sent the Initial UE message. In one example the capability ID may be included in the Initial UE message to the AMF. i.e., it includes the NAS message piggybacked in the Setup Complete step 3. In one embodiment, therefore, the Capability ID reaches the AMF prior to transmission of the InitialContextSetupRequest from the AMF to the gNB. In this information there should either be:
1) A Capability ID only
2) A Capability ID+Capability Information corresponding to the Capability ID.

Which case applies may be dependent on, e.g., if the AMF has stored a mapping for that particular capability ID.

Once the InitialContextREquest is received in the gNB, the gNB detects which of the cases above applies and combines this with information as to whether there is any storing of capability ID to capability information mapping in the gNB. If there isn't the gNB may update the mapping table with new information. If the mapping already existed, the gNB can then in one embodiment ignore the capability information received from the AMF and pick the already parsed and processed information from its own ID mapping database. This will then save processing in the gNB.

If the information corresponding to the ID that is available in the gNB is not deemed sufficient, or alternatively, if no mapping data was available (It is not possible to interpret the Capability ID) in the AMF or in the gNB, the gNB may start the process of requesting capability information in an enquiry-information exchange between the gNB and the UE. Note that this procedure is in this illustration executed after security command, i.e., after setup of security between the UE and the gNB. Dependent on the sensitivity level of the ID this may be preferred. If the Capability ID is not sensitive to, e.g., eavesdropping, it may be possible to run the enquiry procedure before security is activated.

The information exchange in the enquiry/information may also include the actual Capability ID.

Once information reaches gNB, it will have all the information that it needs and gNB would then typically, in cases when the AMF didn't have any information, update the AMF with the capability information for that particular UE. The AMF will then indirectly also get mapping data, i.e., an interpretation of the capability ID that it can store in a mapping table. Thus, the AMF will store the capability information in connection to the specific UE information (UE context) and the AMF may additionally store the capability ID to capability information mapping.

According to one aspect of the present disclosure, the capability ID signaled from the UE is a hash-based capability ID.

The hash can be any kind of hash function that operates on the capability information that should be reflected. Examples of hash algorithms that can operate on the capability information created are, e.g., SHA-1 or SHA-2 algorithms with, e.g., various length, for example 256 bits. Other options are of course possible, and it may be attractive to select a shorter hash, e.g., 128 bits to keep the length of the ID down.

The capability information upon which the hash operates is formed as being the response information to a capability enquiry that has a filter equal to a filter that is part of the broadcast information in the cell the UE is targeting access.

This means, in short, that there will be a broadcast of a filter in the cell. This filter will basically indicate the same things as a filter in the capabilityEnquiry procedure.

Based on this filter, the UE would gather capability information in a similar way as if it would send UEcapabilityinformation message based upon the filter. However, in this case, it doesn't send the UECapabilityInformation message but instead performs a hash operation on the capability information The output of this hash operation will become the CapabilityID and this Capability ID is then included in the signaling illustrated above.

Thus, according to embodiments of the disclosure, the gNB will broadcast a filter in the cell. The filter may include for example information about frequency bands and access technologies (e.g., NR, EUTRA,) The filter can also include the max number of carriers and max bandwidth. Other aspects may of course also be possible to put in the filter.

For the UECapabilityEnquiry case, all filter criteria are collected in the IE called UECapabilityRequestFilterNR. In one embodiment, the same format is used also for broadcast of the filter.

In one embodiment, only the UEs that support the Capability ID representation would have to read the filter. In other embodiments, however, UEs that do not use the capability ID method of capability signaling (but instead use other methods) may use the filter for purposes of preparing capability information and then await an enquiry from the gNB. The enquiry message does not have to include the filter if it is the same filter as the one that is broadcast. Thus the broadcasted filter can have a purpose also for UEs that use different mechanisms for reporting their capabilities. These UEs would typically, instead of a hash operation, perform other operations on the capability information element formed based on the filter, or alternatively simply send the capability information element without any further operations being performed.

In one embodiment, only one filter is broadcast by the gNB, such that all UEs that want to use the capability ID feature start from the same filter when creating a hash-based capability ID. In another embodiment, however, more than one filter may be broadcast such that, e.g., specific UEs use one filter and other UEs another filter. This may be feasible if there are UE types that, e.g., are generally more or less stationary and that never move, they may be of low-bit-rate type and the only capabilities that would be interesting may then possibly be limited to, e.g., one RAT and one or two frequencies. In this case a filter could request much less information for that type of UE and such a filter should then be possible to select for calculating the capability ID.

According to certain aspects of the disclosure, the hash generated with the hash operation constitutes the complete capability ID. In another aspect, however, the HASH is combined with another identity portion that together with the HASH will become the complete capability ID. For example, the HASH may be combined with the TAC as described for option 2 above, where the HASH is based on the broadcasted filter.

If different gNBs in the PLMN use (slightly) different filters, this will likely result in different IDs for one single UE. This will however not be an issue neither for the gNB, AMF nor the UE.

The UE may not even need to store any ID for longer duration than their validity, e.g., as long as the UE is in connected mode or registered with the network. In any situations, it would know, by reading a filter broadcast, what ID to use in a cell. The AMF will receive and forward the ID that it receives, that is based on the filter from the gNB. The AMF shall, as usual, store the most recently uploaded capability information coming from the gNB in connection to the UE information (UE context) and in addition it may store the mapping, such that it can reuse or make use of more memory efficient storage of UE contexts.

Figure 6:
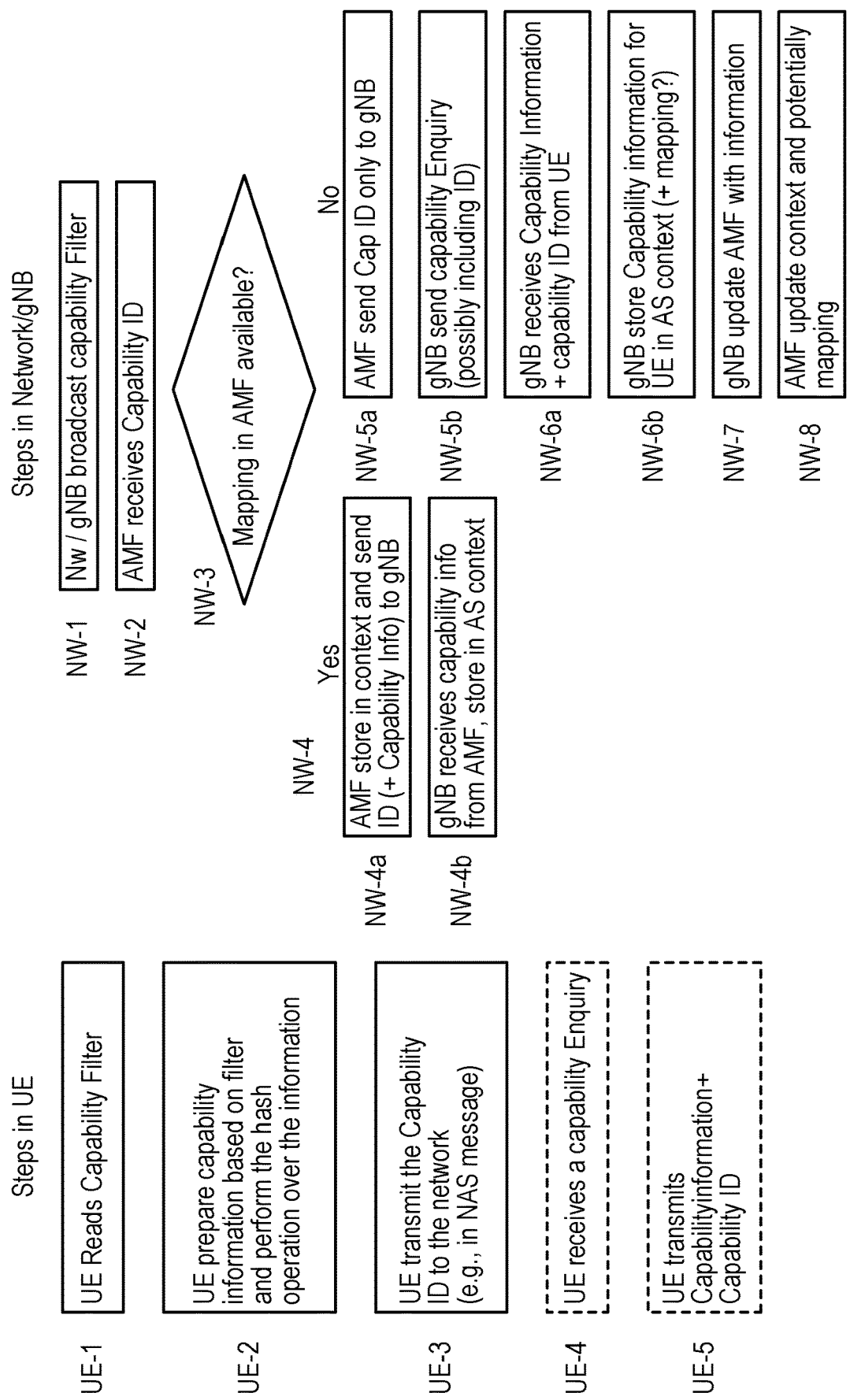
FIG. 6 illustrates flowcharts showing methods according to embodiments of the disclosure.

FIG. 6 illustrates a flow chart of the steps on the UE side and on the network side (gNB and AMF) according to embodiments of the disclosure.

Figure 1:
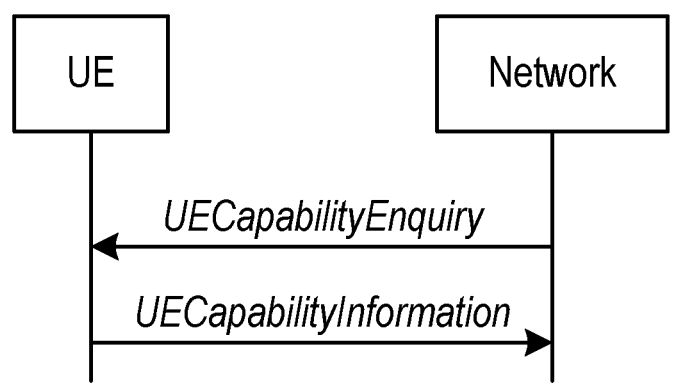
FIG. 1 shows UE capability transfer.
Figure 2:
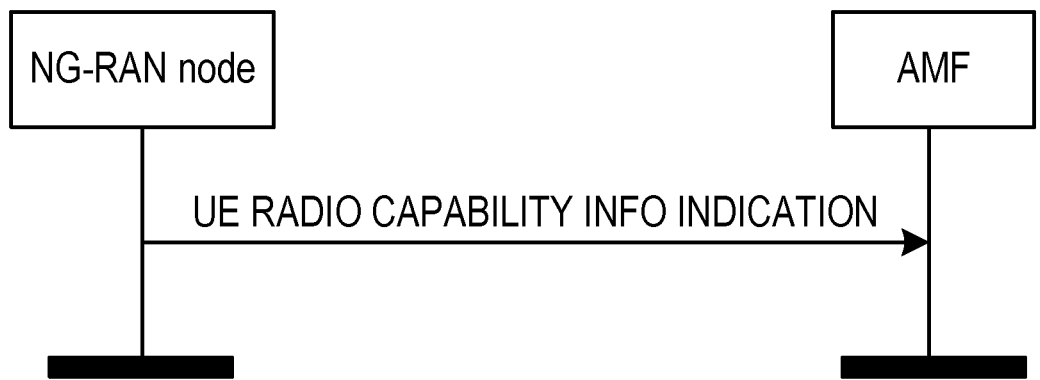
FIG. 2 shows transmission of a UE radio capability info indication.

According to FIG. 6, the steps in the UE are to:
UE-1: Read the broadcasted filter
UE-2: Generate the ID. The UE can process the filter and prepare an information element with all the capability information, and then perform the hash operation to create the Capability ID
UE-3: The UE will then transmit the capability ID in connection to NAS signaling to the network. It should be noted that in alternative embodiments, the Capability ID may be included in RRC signaling, e.g., in the RRC Connection Setup message as it may be considered acceptable to transmit a hash-ID even without any security activated. In this way, the AMF may not be involved in the process of obtaining UE capabilities (other than perhaps to store the capability information at a later time, or request information or mapping data based on the received ID).
UE-4: In situations when the network doesn't have any capability information mapped to the ID generated by the UE (it may be the first time that particular UE type processed that particular filter) then there may be a need for the capability enquiry/information procedure, i.e., the UE will then receive a capabilityEnquiry message from the gNB. This procedure may follow FIG. 1 described above, for example. This capability may further include an indication of the same filter as was broadcast. This can be an explicit indication, e.g., that if there is a capability ID included in the capabilityEnquiry, then the UE should use the filter that was broadcast. In alternative embodiments, there may be situations when the gNB in fact requests other information than what the broadcasted filter would suggest. In this case it can send a new filter in the capabilityEnquiry, and no capability ID. The UE would then receive the enquiry message with a new filter, it can then discard the old hash and calculate a new hash and send both the hash and the capability information in the response in next step.
UE-5: The UE will then transmit the UEcapabilityInformation message including both the capability ID and the capability information the hash was formed from.

The steps on the network side include:
NW-1: Broadcasting a filter from gNB.
NW-2: Next, the AMF receives a capability ID in connection to other signaling. Variants to this may exist, e.g., that the gNB in fact receives the ID directly via RRC signaling.
NW-3: In case AMF receives the Capability ID, it needs to determine if it has any capability data that maps to this Capability ID. Does the AMF know what the ID means?
NW-4: If it does (e.g., if there is mapping data in the AMF), the AMF stores the information in the AMF UE context, which is information that the AMF typically store about the UEs that are registered in the network (4a). It can then forward the information to the gNB (4b), or alternatively, it can forward only the Capability ID and if gNB has local storage of mapping, there will be savings over the NGAP interface to only transfer the Capability ID, and not all the data. If the gNB then does not have the mapping required, it needs to perform a request to the AMF to clarify if the data is available in the AMF, that it should be sent to the gNB. The gNB will then store the capability information in connection to the AS context which is information that the gNB typically store about UEs that are in RRC_CONNECTED or in RRC_INACTIVE.
NW-5: If the AMF does not have the information related to the received capability ID over NAS, it will need to indicate this to the gNB (5a). One way of doing this is to send only the ID, and possibly also an indication that the capability data for that ID is not available. This would mean that if the gNB doesn't have the data either, an enquiry procedure is needed (5b). The enquiry procedure may follow that illustrated in FIG. 1, for example. If on the other hand mapping data is available in the gNB, the capability enquiry would not be needed. In the illustrated flow chart, the gNB does not have any translation of the capability ID into capability information stored. The gNB thus sends the capability enquiry, possibly including a new filter, or the Capability ID.
NW-6: The gNB will then receive a response (6a), including both a filter, a capability ID and capability information. This would allow the gNB to store the mapping, or to only store the capability information (6b) and
NW-7: Update the AMF with the new information, including both the capability information as well as the Capability ID.
NW-8: The AMF will update the UE context in the AMF, which is information that the AMF typically stores about UEs that are registered in the network.

In another aspect of the present disclosure, a filter is sent to the UE, not via broadcast as described above, but in a dedicated message to a specific UE. Transmission via dedicated signaling may have an advantage of utilizing relatively fewer radio resources than broadcast messages.

In accordance with 3GPP NR standard and FIG. 5a, a connection to the network starts with a setup request for a signaling connection: an RRCRequest from the UE. This is illustrated as step 1 in FIG. 5a, but it is actually commonly referred to as "msg3" as in message 3, since this message may be preceded by two more messages targeting resource setup for this message (not shown in FIG. 5a, e.g., a random access preamble and a random access response). The response from the network is an RRCSetup message. In the signaling diagram shown in FIG. 5a this is illustrated as step 2, from the gNB to the UE. The RRCSetup message is sometimes referred to as msg4, or message4, following msg3 as described above.

The setup message is described in 3GPP TS 38.331 v 15.4.0 for NR and includes a configuration of a signaling connection that is used to signal further information back and forth between UE and network. According to one aspect of the present disclosure, the filter to be used to transfer the capability ID is transferred in the setup message, or msg4 as described above. This message is sent early in any communication, such that the UE will have available and also have time to process its capability information and capability ID prior to when it is needed, or needs to be transmitted in subsequent messages.

The RRCSetup message is used to setup a signaling connection quite often, every time the UE has moved to RRC_IDLE state and need to restart signaling with the network. It is however not necessary to transfer capability information each time the UE sets up an RRC connection with the network. The UE is typically registered and attached to the (core) network and the core network maintains an identity of the UE and keeps a UE context, i.e., information about the UE, including capability information. This UE context may be referred to herein as NAS UE context. There is also a context that is stored in the radio network nodes when the UE is in RRC_INACTIVE state or in RRC_CONNECTED state. This UE context may be referred to herein as UE AS context, to differentiate between the two UE contexts.

What is noted though is that the UE will receive an RRCSetup message more often than it needs to transmit capability information, and thus it is unnecessary or undesirable to include a capability filter description in each RRC Setup message. Even though it is not a huge amount of bits, the frequency of network sending RRCSetup messages will make it an unnecessary burden on the air interface.

When the UE sends msg3, or the RRCRequest message (the first message in the sequence of messages in FIG. 5a), it can include one of two identity formats. 3GPP TS 38.331 v 15.4.0 states:

"The UE shall set the contents of RRCSetupRequest message as follows:
1> set the ue-Identity as follows:
2> if upper layers provide an 5G-S-TMSI:
3> set the ue-Identity to ng-5G-S-TMSI-Part1;
2> else:
3> draw a 39-bit random value in the range 0 . . . $2^{39}-1$ and set the ue-Identity to this value;
NOTE 1: Upper layers provide the 5G-S-TMSI if the UE is registered in the TA of the current cell."

In msg3/RRCSetupRequest (or RRCRequest for short) message, a UE identifies itself using one of two IDs. It is either a TMSI a Temporary Mobile Subscriber Identity, for 5G referred to as 5G-S-TMSI, or, in case UE does not have a valid 5G-S-TMSI value assigned, it includes a random sequence. Whenever a UE identifies itself with a random sequence, this is an indication to the radio network and gNB that the UE is not registered with any AMF and thus needs to transfer capability information in a subsequent communication.

In this aspect of the present disclosure, the network may selectively include a filter description in msg4 and base this on the type of identifier included in the msg3 received from the UE. Whenever the UE includes a random sequence as its identification in msg3, rather than a (5G-S-)TMSI, then the network responds in msg4 with a setup message including a capability filter that the UE may use to calculate a capability ID and transfer in subsequent communication. Alternatively, if the UE includes a (5G-S-)TMSI in msg3/RRCSetupRequest message, the network will respond with a msg4, RRCSetup message which does not include any capability filter description. When a (5G-S-)TMSI is included in msg3, the receiving radio network node can operate under the assumption that the UE is registered with an AMF and that there is a UE context in an AMF which is identified via the TMSI identifier. Then, the core network will already have relevant capability information for that UE.

Thus, in one embodiment of the present disclosure, inclusion of a capability filter indication in the RRCSetup message (aka msg4 in setup sequence) is conditional and based on the type of identifier included in msg3 (RRCSetupRequest message, or RRCRequest message): a random identifier or a 5G-S-TMSI, or part of a TMSI.

The signaling diagram for NR as described in various embodiments of the present disclosure is in relevant aspects identical to signaling for LTE radio networks and even though the disclosure is described for NR, for gNBs and for AMF nodes, it is equally applicable to implement both this signaling aspect as well as broadcasting of filters also in networks pursuant to LTE/E-UTRA specifications, including eNB nodes and MMEs.

Figure 7A:
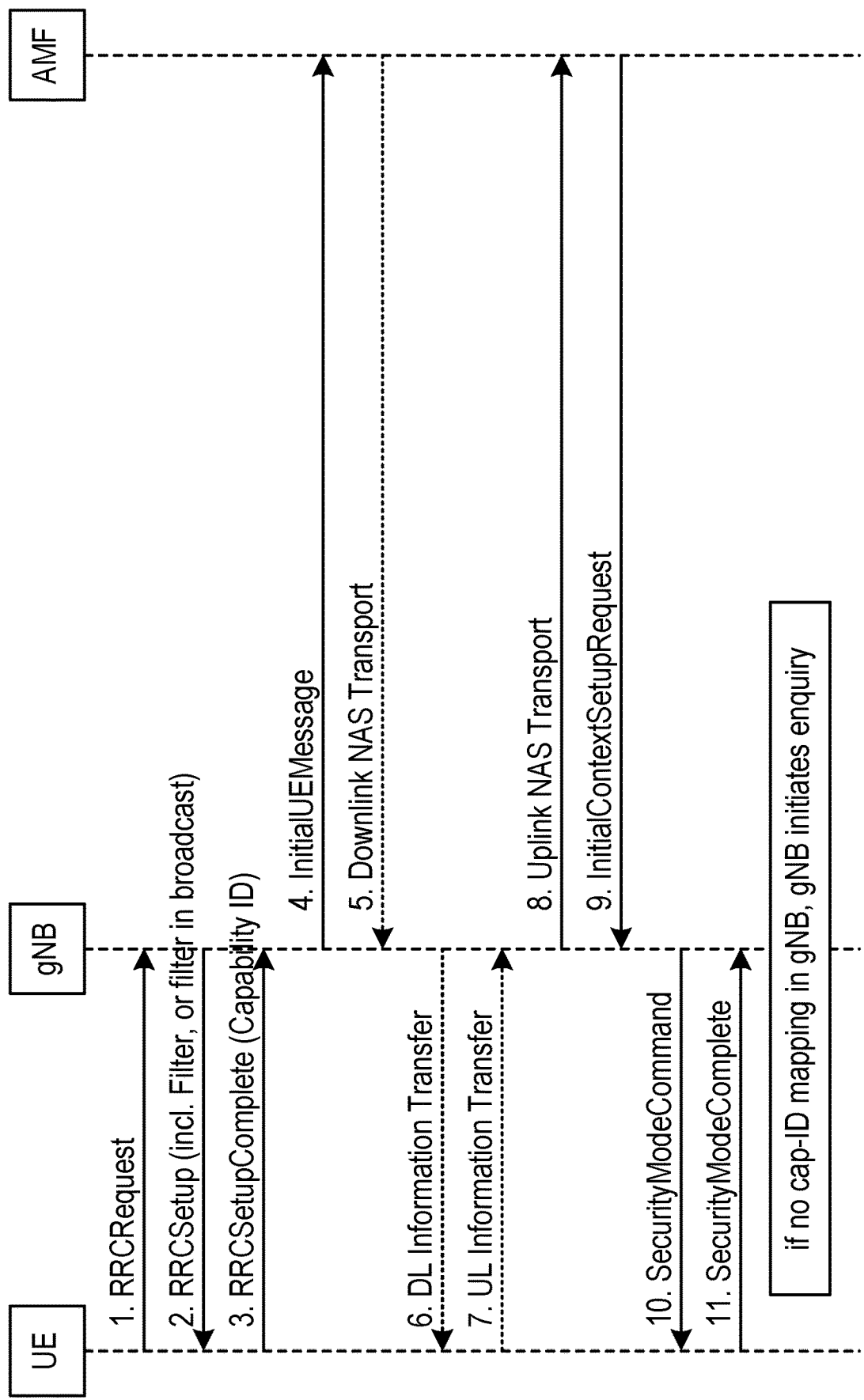
FIGS. 7a and 7b show a signalling diagram showing transfer of capability information according to further embodiments of the disclosure.
Figure 7B:
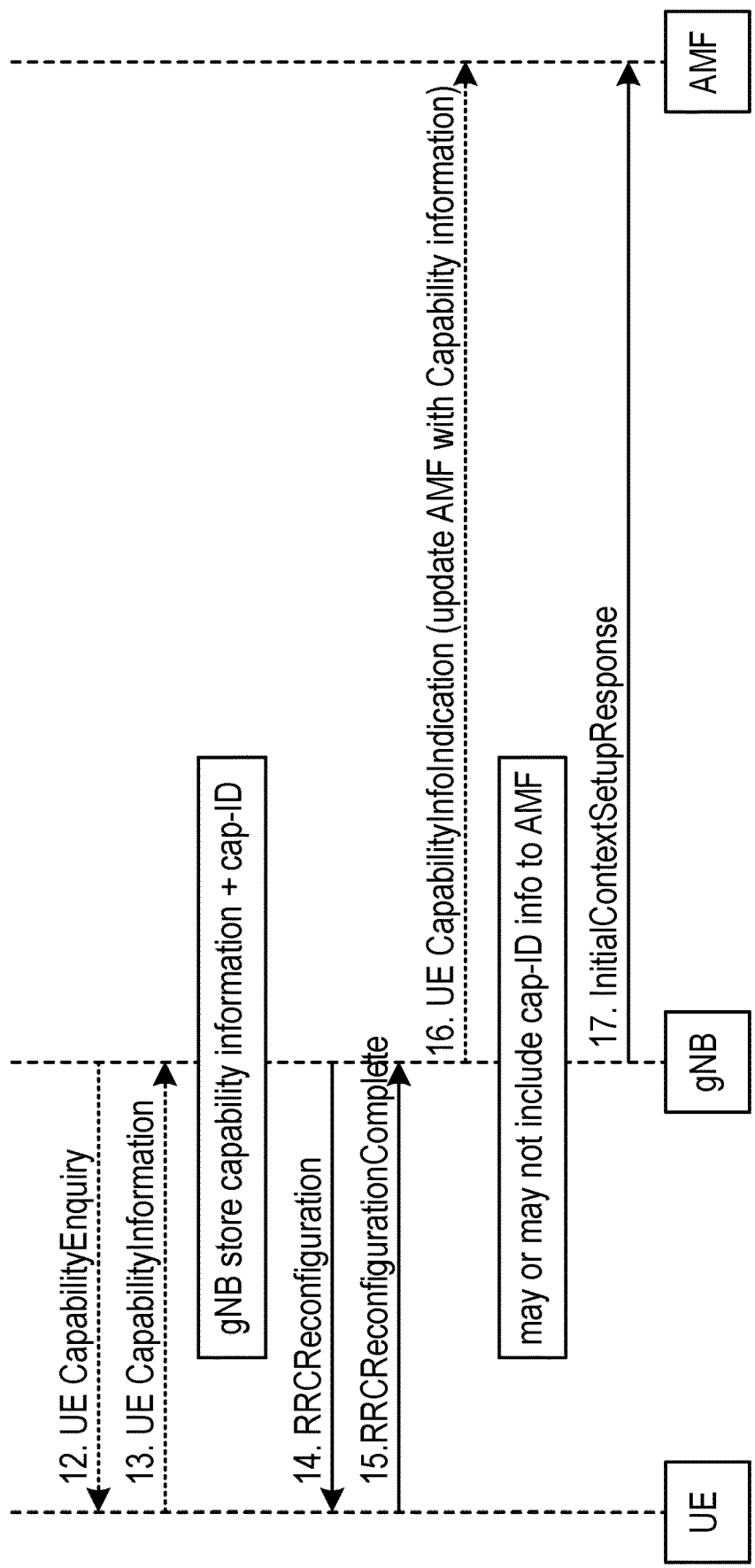

As noted above, in some embodiments of the present disclosure, the hash-based capability ID is stored in the radio access network (e.g., in the base station or gNB), potentially in addition to its storage in the core network (e.g., in the AMF). The following description, with reference to FIGS. 7a and 7b, provides further detail regarding this embodiment. Thus FIGS. 7a and 7b show a signaling diagram showing transfer of capability information according to further embodiments of the disclosure. In the illustrated embodiment, the Hash-based Capability ID is generated by the UE and communicated to the network, but instead of being communicated to the AMF, the capability ID is kept in the radio access network, e.g., it is kept in signaling between the UE and the gNB. In this embodiment, therefore, the AMF may not store the capability ID at all, but merely the capability information associated with the UE.

As can be seen from FIG. 7a, the initial RRC signaling between the UE and the gNB includes signaling of the Capability ID in msg5/RRCSetupComplete message. The gNB will already at this point be able to check if the capability ID is known to the gNB (e.g., stored in a database of known capability IDs and corresponding capability filters). If the capability ID is known in the gNB and mapping data is available, it would be possible to omit steps 12 and 13 in FIG. 7b, and not request any explicit capability information from the UE. If on the other hand, the capability ID from step 3 is not known to the gNB, the gNB follows steps 12 and 13 to request information as to what the capability ID means, e.g., the capability information is requested and then explicitly signaled back to the gNB (e.g., as included in the UECapabilityInformation message). It should be noted that for both this or other embodiments it is possible that the UECapabilityInformation is a large message and may therefore be segmented.

It will be noted that step 16 in FIG. 7b shows the RAN node (e.g., gNB) sharing the capability information for the UE with the core network (e.g., the AMF). According to embodiments of the disclosure, this capability information may include just the capability information itself (e.g., the explicit capability information for the UE); that is, the hash-based capability ID may not be shared with the core network. One advantage of this embodiment is that there is no impact on any network nodes (except the gNB) with the capability ID based on HASH and early filter indication if the ID is communicated to the gNB only (e.g., over RRC signaling). In an alternative embodiment, the capability ID may additionally be shared with the core network node in step 16, e.g., for inclusion in the context information stored in the AMF. In this case, the AMF may not have to process or interpret the information, but only keep it for, e.g., purposes of signaling capability information to other nodes (e.g., when the UE experiences a mobility event such as handover or dual connectivity, etc).

One of the issues with Hash Identifiers or sequences generated using Hash operations is that it is not guaranteed that they are unique. There may be situations in which two different capability strings may generate the same Hash value and thus capability ID. It may even be the case that these two identical Hash IDs are generated by different capability strings that are generated with the same capability filter. Alternatively, a different filter may be provided.

Thus, one way of describing the Capability ID (in the following also referred to as Hash ID) is that it is at least a function of UE capabilities, but also of the capability filter. Expressed in a different way;

Hash ID=f (capability information, capability filter, hash algorithm)

Now, as stated, collisions may occur when the same hash value is created for different combinations of capability information and capability filter. In such situations, it may be difficult for the collision to be detected. Assume for example that UE1 and UE2 are two different types of UE where UE1 is more capable than UE2 (e.g., is able to perform a greater range or number of functions, to achieve a higher data rate, etc). For example, UE1 may be more expensive or modern than UE2. Assume now that, in a cell, capability filter F1 is used (either through broadcast or dedicated messaging).

The two UEs will generate:

Hash ID (UE1)=f (UE1 capability information, capability filter F1, Hash algorithm)

Hash ID (UE2)=f (UE2 capability information, capability filter F1, Hash algorithm)

Now if Hash ID (UE2) and Hash ID (UE1) are identical, but the network first received Hash ID (UE2), it will map this ID to UE2 capability information. If UE2 was a less capable phone (as in the present example), there will most likely never be a failure in mapping this information to UE1, but UE1 will never be configured with more advanced configurations that it is capable of.

On the other hand, if the Hash ID (UE1) is stored in the network together with capability information related to UE1, the network will map the particular Hash ID to the capability for UE1. If this capability is assumed when UE2 arrives, then it is quite likely that configurations provided to UE2 will fail, as the network will operate as if UE2 is much more capable than it actually is. According to this aspect of the present disclosure a collision detection mechanism for capability IDs is then a request for re-establishment by a UE. The request for re-establishment may comprise an indication of a reason for the re-establishment. For example, the reason may comprise reconfiguration failure or even a specific failure indicating to the network that the reconfiguration attempted was something that the UE was not capable of. Current reestablishment causes include reconfiguration failure (see 38.331, v 15.4.0), but there is a spare value that may be used for, e.g., "reconfiguration-capability caused" or something similar indicating to the network that it should re-request capability information. Then, the re-establishment in itself is a collision detection mechanism, or at least an indication that the network should re-request capability information and capability ID, and compare the re-requested information with stored ID and its corresponding capability information to detect a collision.

In one aspect of the present disclosure, perhaps in particular to detect capability ID collisions that do not cause a reconfiguration failure, known capability ID and mapped capability information are refreshed, updated or re-requested such that the detection of collisions is easier. According to this aspect, even though the network has knowledge of a mapping between a Hash ID and capability information, e.g., as described above for UE1, once it will regardless request capability information (e.g., regularly or irregularly). The UEs then have to provide capability information to the network and the network can compare the stored capability information for the capability ID with the most-recent capability information received from the UE for that capability ID, e.g., Hash ID(UE1).

If there is a match of capability information, then no collision is detected, whereas if there is a mismatch of capability information between the stored information (for the same Hash ID) and the received information, then a collision is detected.

Thus, by requesting capability information for already known capability IDs it will be simpler to detect collisions. The algorithm for requesting capability information can be made in a number of various ways. It can for example be run differently on different IDs and if there is no detection of collisions the request cycle can be extended, whereas if there is a detected collision, the algorithm will be run continuously as there would be no way of otherwise knowing what capabilities a UE has.

Alternatively or additionally, mapping between capability IDs and capability information may be stored for a defined period, but then flushed (e.g., regularly). For common UE types (and corresponding capability IDs) the database of stored information is quite quickly built-up again and this flushing will allow for new definitions of capability IDs to be generated, making it less likely that collisions will occur.

In one aspect of the present disclosure, the collision is detected by comparing "bitwise" the capability container stored in the AMF. The AMF does not need to interpret the capabilities or do any parsing of the information included in the containers, only simply bit-wise compare.

Another method of detecting collision of Hash IDs is to allow the gNB to do the operation. As the gNB can do more with capability information, i.e., parse and interpret, more options are possible.

If collision is detected, it is going to be difficult to use the method with Hash ID for this particular type of UE and every time the ID is communicated, it may anyway be necessary to request the information in a subsequent enquiry/information procedure. As described above, the Hash ID is a function of at least filter and capability information, e.g., Hash ID=f (capability information, capability filter, hash algorithm)

If there is an unfortunate collision of Hash ID it can be possible to, e.g., change the filter, such that the collision may be avoided. By simply altering the input (e.g., only slightly), it may be possible to avoid the collision. It doesn't really change the collision probability though, one effect may be to simply move the collision from two certain UEs and their responses to a certain filter. However, this may be sufficient in certain circumstances. In a situation when two of the most common UE models generate two different capability information strings for the same common capability filter and these strings produce an identical Hash ID, this would be a situation much worse than if two very rare UE models were to generate IDs that collide. The savings potential using ID instead of capability information is obviously larger for common UE models than for rare models. However, changing the filter may not be desired, as operations actually do require certain information.

One way to address the collisions while avoiding changing the filter is to allow the Hash ID be a function of yet another input parameter (i.e. in addition to the filtered set of capabilities) such that collisions between certain capability information and filter combinations no longer occur.

If Hash ID is identical for

Hash ID (UE1)=f (UE1 capability information, capability filter F1, Hash algorithm)

Hash ID (UE2)=f (UE2 capability information, capability filter F1, Hash algorithm)

as described above, it is most likely not identical if another input parameter is added:

Hash ID (UE1)=f (UE1 capability information, capability filter F1, Hash algorithm, Hash-coil-input)

Hash ID (UE2)=f (UE2 capability information, capability filter F1, Hash algorithm, Hash-coil-input)

Where Hash-coil-input can be any number or short sequence that the UE will also use as input to the hash operation. There are no guarantees that the outcome will not be identical too, but it is much less likely that it will, as the inputs are changed. This will depend on the hash algorithm used. Even though the inputs are changed in the same way, the impact on the hash value may be different as different sequences are created. Alternatively or additionally, the order of one or more bits of the input (e.g., the first X bits) may be altered in a defined way (e.g., reversed, or inverted). This can also be commanded by the Hash-coil-Input parameter illustrated above, which may be optionally sent and possibly also only sent when there is a need to separate collisions of two common UEs together with a common filter.

Thus, according to one embodiment a parameter "Hash-coil-input" may be added to the inputs to the hash function in addition to the filtered set of capabilities. Some examples of suitable parameters may be a bit sequence or an instruction to change an existing bit sequence in the UE, (e.g., the filter, or the capability information, or both).

If this Hash-coil-input is used, then it should also be part of the description of when a mapping is stored, otherwise, it will not be possible to verify a hash operation as performed by the UE.

In one embodiment, the flushing of capability IDs and corresponding capability information from the mapping table may occur in conjunction with a change to the additional parameter Hash-coil-input used as an input to the hash operation. For example, the change to the additional parameter may happen simultaneously with, or as a consequence of, the flushing of a capability ID from the mapping table. Thus, upon detection of a collision between identical capability IDs but non-identical capability information, one or both of the colliding UEs may be instructed by the gNB to use a different additional parameter Hash-coil-input in the hash operation used to calculate the capability IDs. In this way, once a collision has occurred between identical capability IDs, similar collisions are made much less likely through the change to the additional parameter.

Thus, according to another aspect of the present disclosure, and to address collisions, an additional parameter (Hash-coil-input) is included in connection to the filter, to allow for different results when performing a hash operation. This additional parameter may allow for hash collisions of, e.g., very common UEs in combination with very common filters, to be addressed. This addition of an additional parameter does not necessarily change the collision probability, but it allows for the problem to be moved away from a specific filter and a specific UE capability information set. An indication of the hash-coil-input parameter may be broadcast in solutions that broadcast filter descriptions, or it can be part of dedicated signaling in RRCSetup messages for solutions that utilize this method.

According to one aspect of the present disclosure, gNB will thus add an additional parameter to broadcast filter information to change the input to the hash. Alternatively, the gNB will change the filter input to the dedicated signaling as described above, i.e., msg4 signaling, such that the UE will create a different hash where collision probabilities are moved away from a particular combination. In a yet further embodiment, the additional parameter may be signaled to the UE in a request for capability information (e.g., UECapabilityEnquiry—see 3GPP TS 38.331, v 15.4.0).

According to a further alternative aspect of the present disclosure, a collision is detected and then two different capability containers are stored together with the ID in a mapping table. Whenever this capability ID is used again, the AMF will provide both information containers and possibly an explicit indication to the gNB that the capability ID is not unique. Alternatively, the gNB itself may store the mapping table or database, and identify when a capability ID is not unique. In either case, the gNB will need to re-request explicit information from UEs that generate the capability ID that is similar to another generated ID.

According to another aspect of the present disclosure, the storage of mapping between capability ID and capability information in the network is flushed regularly. The reason for why this is done is that even though capability ID collisions may be detected if reconfigurations fail, they will not be detected otherwise. This may result in that advanced UEs that are capable of, e.g., very high rates, may never be configured with such high rates if they have capability ID that is the same as a less advanced UE. If the mapping tables are flushed from time to time, or flushed in sequence, in particular for IDs that are commonly signaled, then it is much less likely that such an ID problem will occur. A random or repetitive request of capability information also for IDs for which the nodes have already stored information may also reveal a collision of hash and can be done, e.g., regularly or irregularly and also dependent on ID type used. If an ID is used often, it can be checked more often.

Another method of addressing collisions is to, when collisions have been detected, e.g., in the AMF by receiving a different capability container for an ID than what it currently has stored (can be detected through bit-wise comparison) is to store the two different capability containers (e.g., separate sets of capability information) in the AMF in a manner which is associated with the particular capability ID. The AMF may then signal both capability containers to the gNB, and the gNB can decide if the two capability containers differ in any significant aspect that would require a new enquiry message. For example, even though the capability information may differ, they may not differ in a manner which is significant for the gNB. Thus, even if there is a detected collision and two sets of capability information create same Hash ID, it can be up to gNB to handle this. AMF simply stores capability containers under same ID.

gNB can be configured to always request explicit information at collision indications, or it can be configured to only send reconfiguration messages to UE that would work according to both sets or containers of capability information, or it can start to send a Hash-coil-input together with the filter description in the cell and try to move collision away from a certain UE type.

In a further embodiment, an indication of the length of the hash used to calculate the capability ID may be communicated to UEs. For example, the indication may be communicated by the gNB to one or more UEs via broadcast (e.g., system information), or as dedicated signaling in msg4, e.g., in the RRC Connection Setup message or a UE capability enquiry message (UECapabilityEnquiry (in 3GPP TS 38.331, v15.4.0). If the information is provided as broadcast information it may apply for all UEs in the cell, unless also signaled via dedicated messages such as msg4 or the UE capability enquiry message.

By signaling the length of the hash to UEs, this embodiment enables dynamic control of the hash length by the network. For example, upon detection of one or more collisions between identical capability IDs and non-identical capability information in a stored mapping table (either in the gNB or a core network node such as AMF), an indication of an increased hash length may be signaled to one or more UEs to reduce the likelihood of collisions in future. For example, the hash length may be changed or increased upon detecting a collision, or a certain number of collisions within a given time window.

Thus in one embodiment, the gNB signals to the UE indications of one or more of the following: capability filter F1, HASH-algorithm, HASH-length, HASH-coil-input. The UE may use these one or more as inputs when calculating the HASH ID as per the following (in the following example they are all used as input, together with the UE capability information):

Hash ID (UE)=f (UE1 capability information, capability filter F1, Hash algorithm including Hash-length, Hash-coil-input)

If one or more collisions occur, the network can instruct the UE to switch to another hash length. For example, the UE may be instructed to change from calculating a 64-bit capability ID to a 128-bit capability ID. By extending the length of the capability ID that is calculated, the collision probability is decreased.

In one embodiment, the capability mapping table may be flushed entirely upon a change to the capability ID length, such that there is no mix of different capability ID lengths in the mapping table. In alternative embodiments, however, it may not be necessary to have a consistent capability ID length, with different lengths being allowed. This may be particularly convenient, for example, if only certain UEs are asked to provide capability IDs using different hash lengths (e.g., via dedicated signaling).

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network. Those skilled in the art will appreciate that the WDs 810 may correspond to the UE described above with respect to FIGS. 3, 5*a*/5*b* and 6, for example, while the network nodes 860 may correspond to the gNB or base station described above with respect to FIGS. 3, 5*a*/5*b* and 6.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
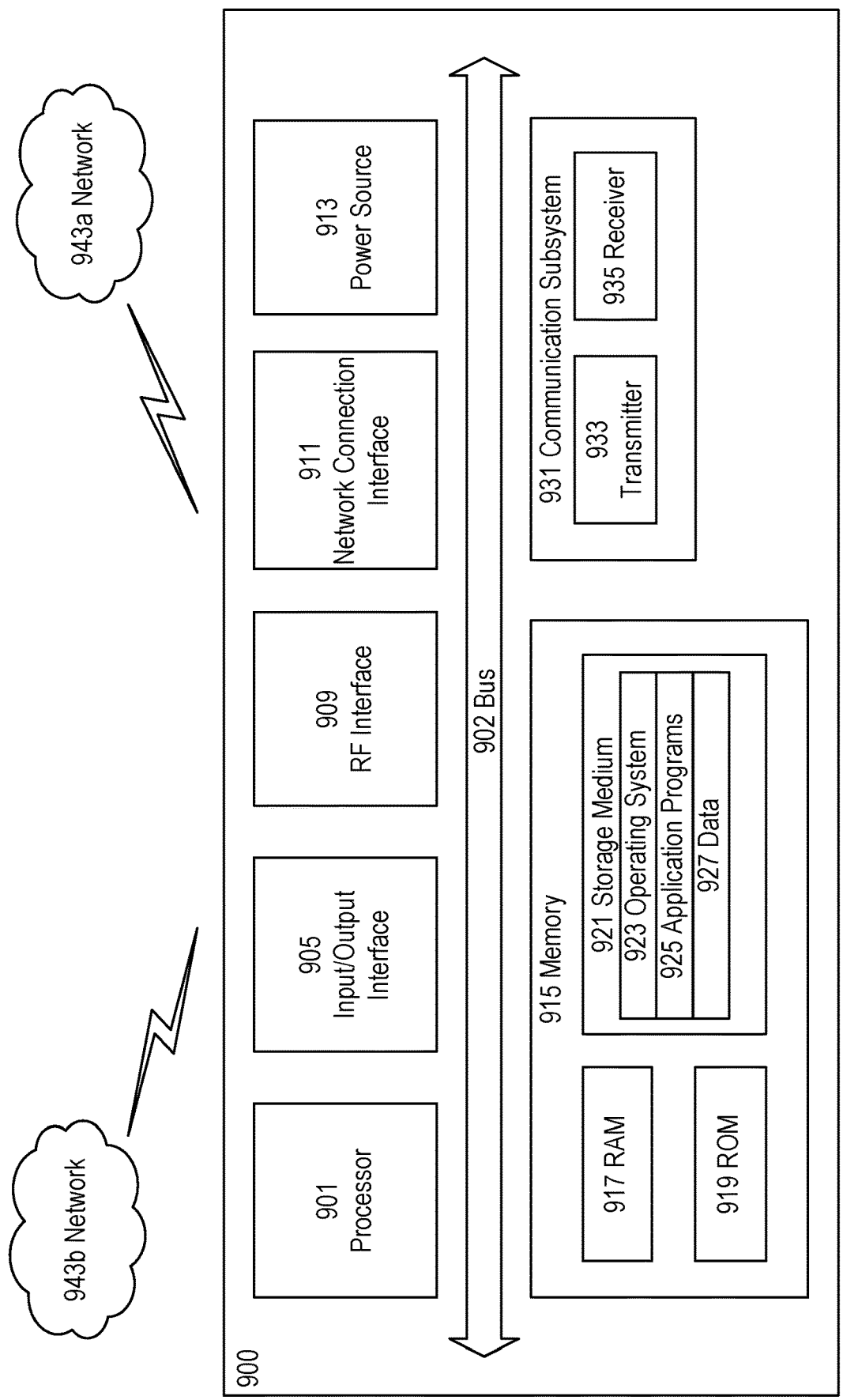
FIG. 9 shows a user equipment according to embodiments of the disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, Wi Max, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
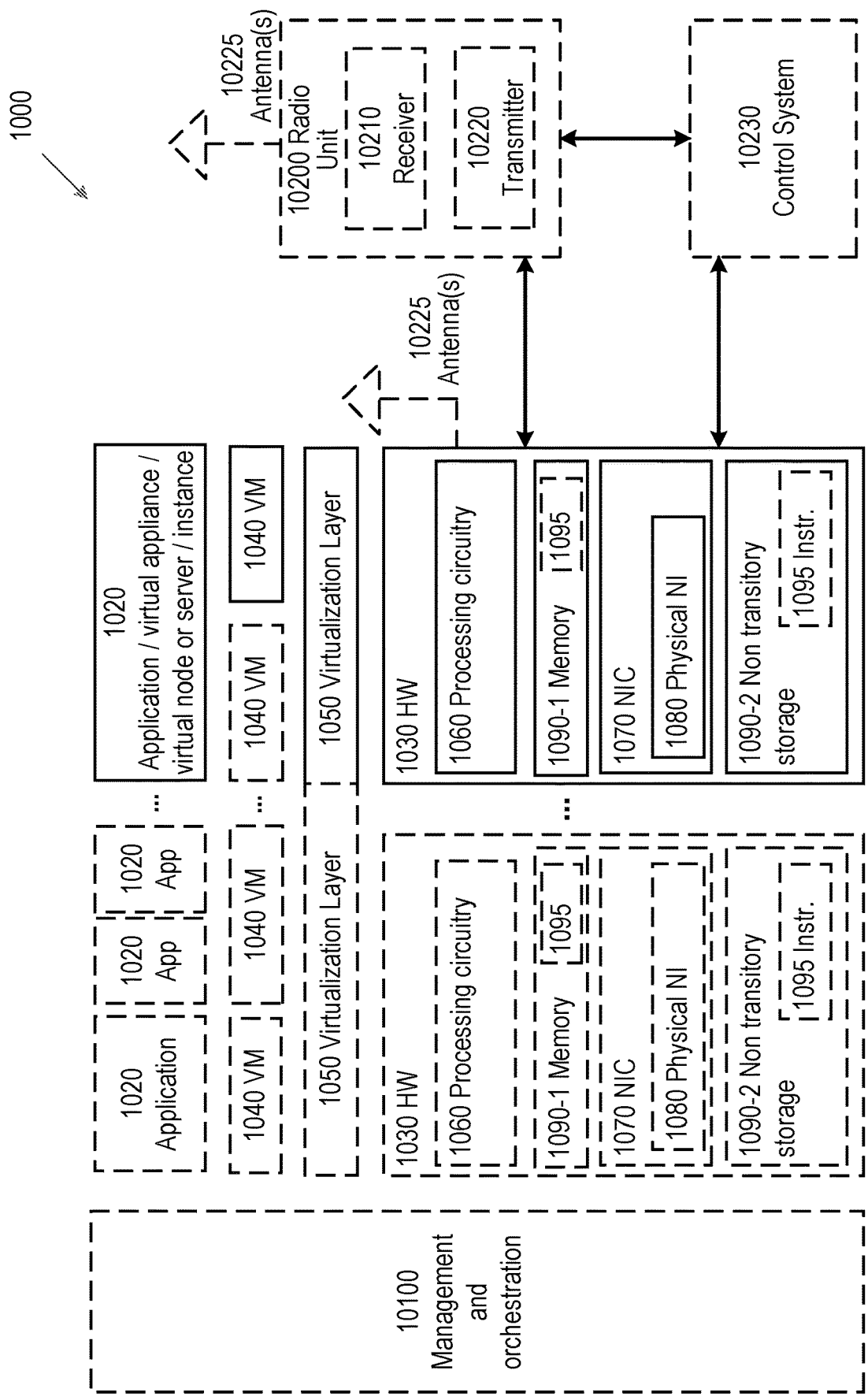
FIG. 10 shows a virtualization environment according to embodiments of the disclosure.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
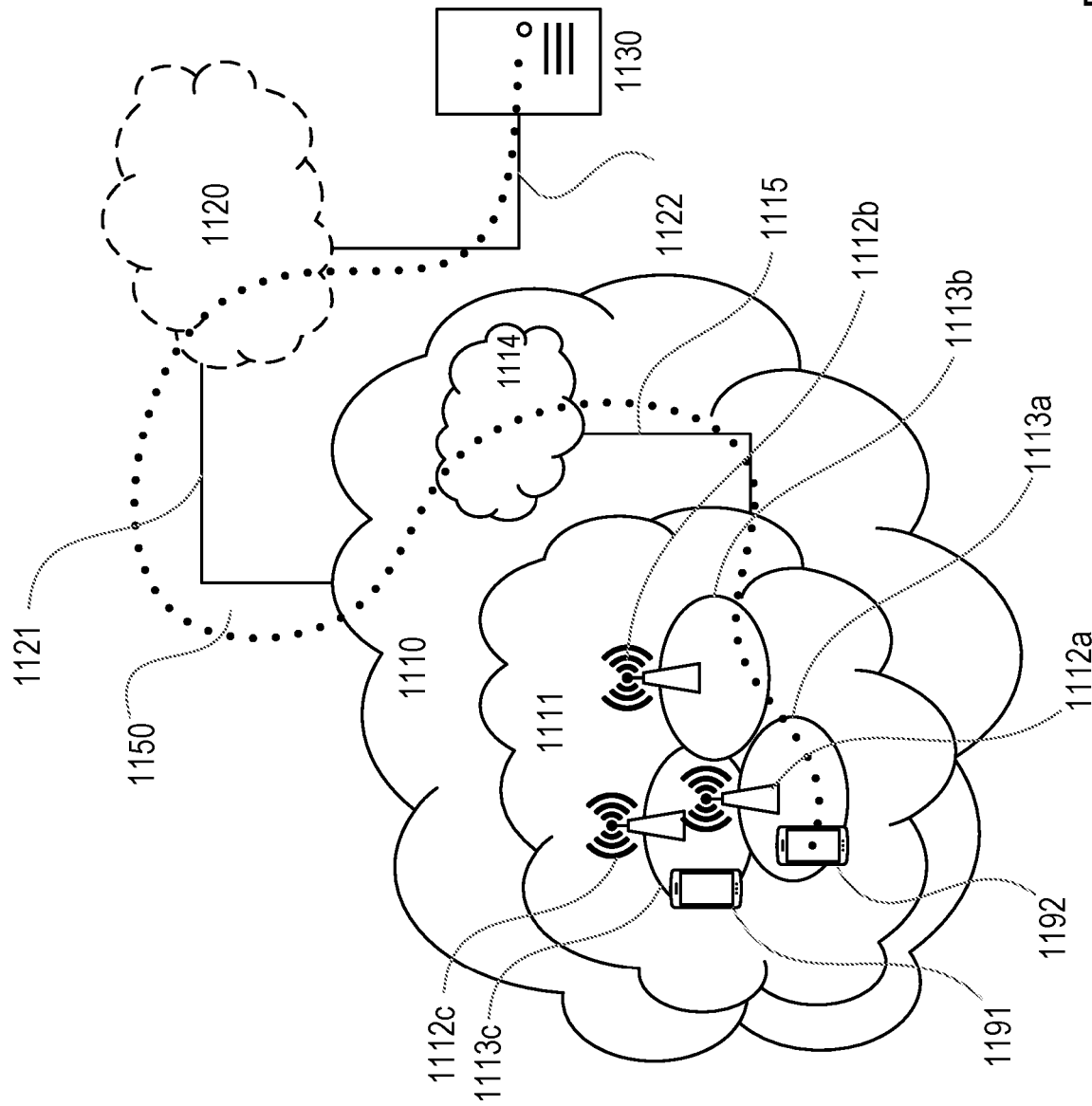
FIG. 11 shows a telecommunication network connected via an intermediate network to a host computer according to embodiments of the disclosure.

FIG. 11 shows a telecommunication network connected via an intermediate network to a host computer in accordance with some embodiments. With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to core network 1114 over a wired or wireless connection 1115. A first UE 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
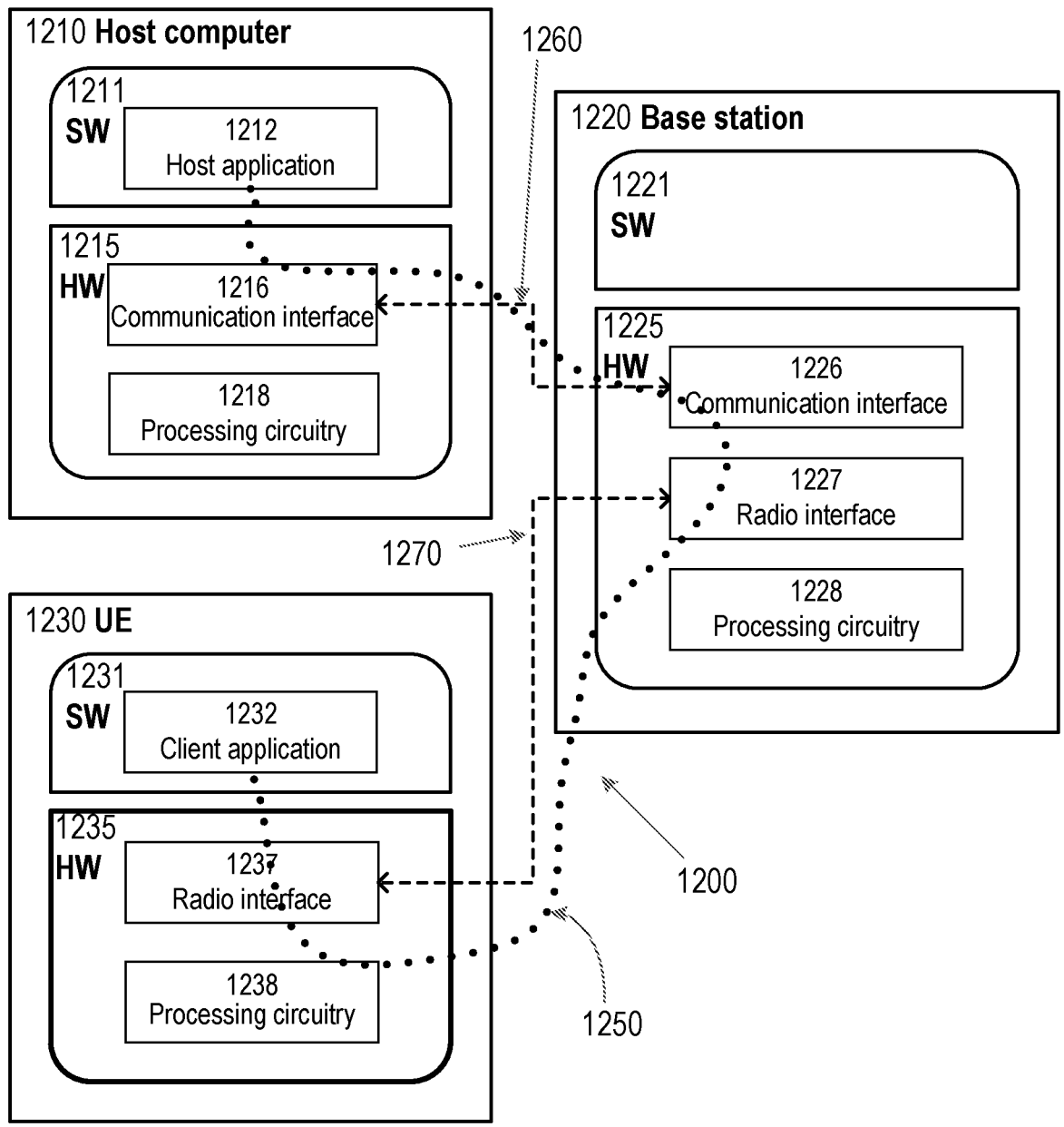
FIG. 12 shows a host computer communicating via a base station with a user equipment over a partially wireless connection according to embodiments of the disclosure.

FIG. 12 shows a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions.

Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may reduce the amount of signaling to attach to the network and thereby provide benefits such as reduced user waiting time and extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
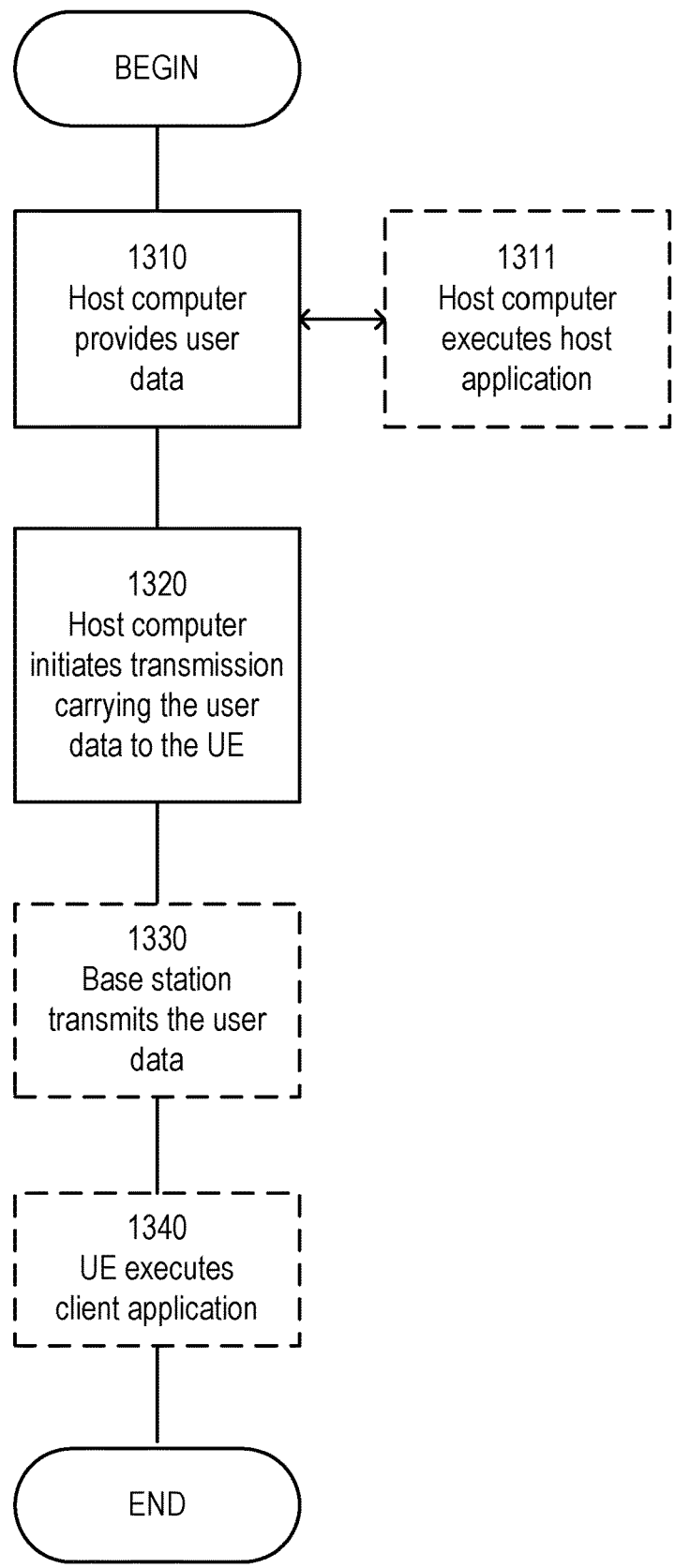
FIGS. 13 to 16 are flowcharts of methods implemented in a communication system including a host computer, a base station and a user equipment according to embodiments of the disclosure.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
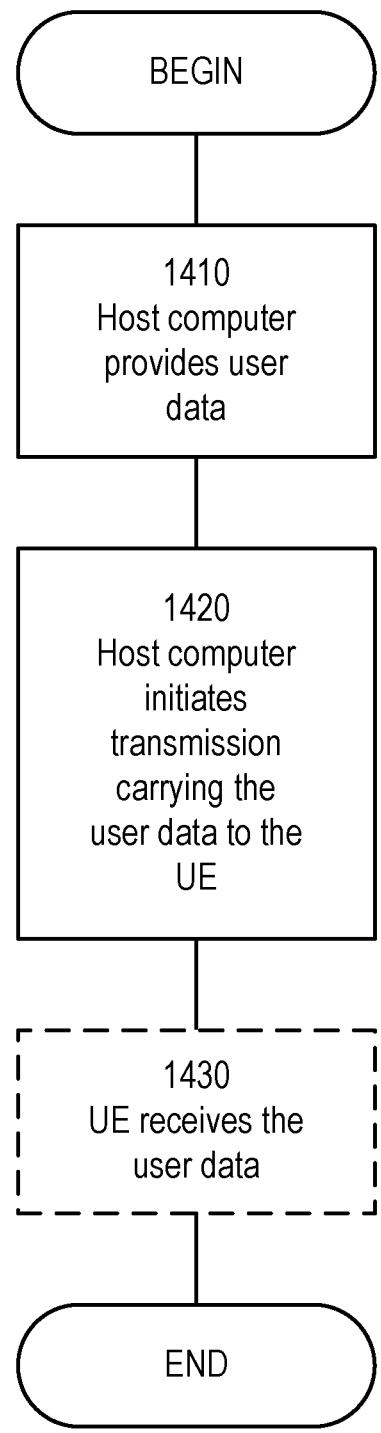

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
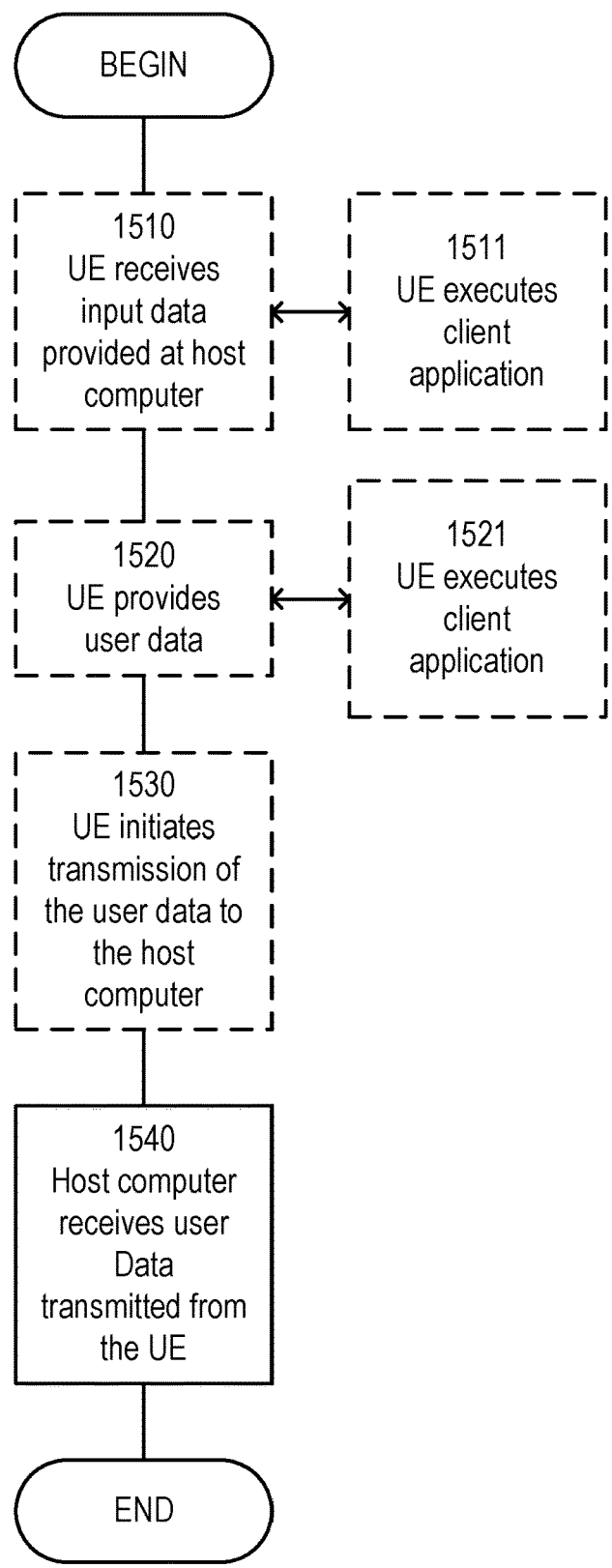

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
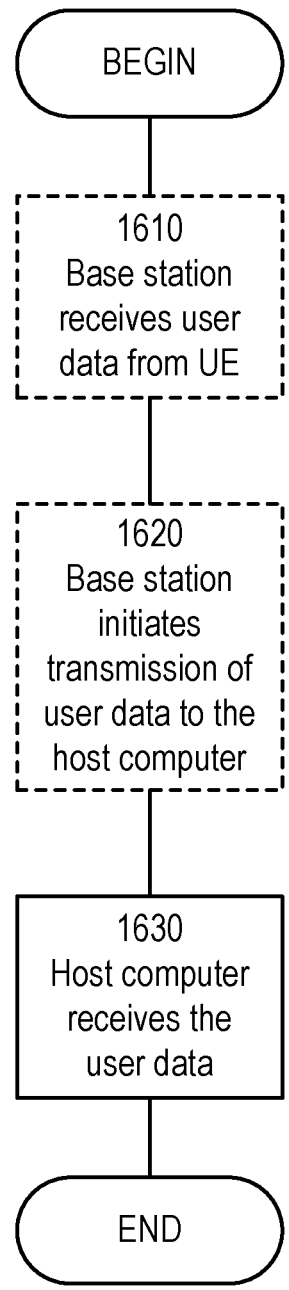

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Figure 17:
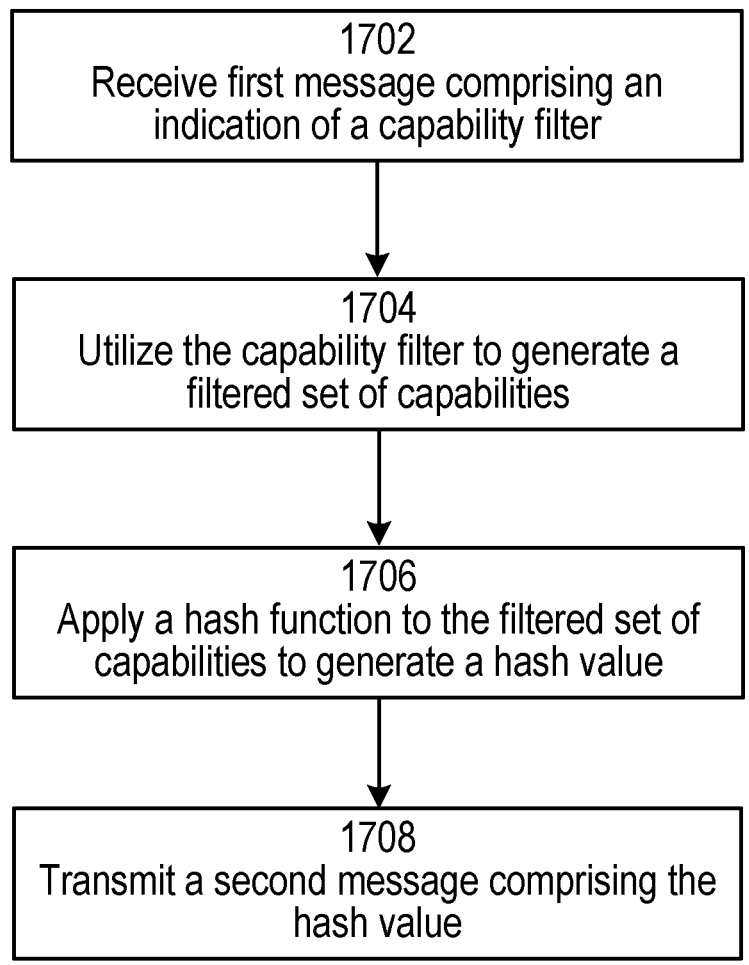
FIG. 17 is a flowchart of a method in a wireless device according to embodiments of the disclosure.

FIG. 17 depicts a method in accordance with particular embodiments. The method may be performed by a wireless device, such as the UE or wireless device shown in any of FIGS. 3, 5a/5b, 6, 7a/7b, 8 and 9. In some respects, the method may correspond to the UE signalling in FIGS. 5a/5b and/or 7a/7b, and/or the UE steps described above with respect to FIG. 6.

The method begins at step 1702, in which the wireless device receives a first message from a base station or network node. The first message comprises an indication of a capability filter. The first message may be broadcast by the base station (e.g., to the entire cell), or sent via dedicated signalling to the wireless device.

The capability filter may comprise indications of one or more capabilities of the wireless device which are to be reported to the base station. For example, the one or more capabilities may comprise one or more of: radio access technologies which the wireless device is capable of using; frequency bands which the wireless device is capable of using; a maximum bandwidth the wireless device is capable of using; and a maximum number of carriers the wireless device can be configured with. The capability filter may be formatted as a UECapabilityRequestFilterNR information element.

In some embodiments, the first message comprises an indication of a plurality of capability filters. For example, each capability filter of the plurality of capability filters may be associated with or suitable for particular UEs, or particular types of UE (e.g., categories of UE, different UE mobilities, etc). In such embodiments, step 1702 may further comprise the wireless device selecting the capability filter which is suitable for or associated with it.

In embodiments where the first message is transmitted via dedicated signalling to the wireless device, the first message may be provided within a response message to a connection setup request message transmitted by the wireless device. The response message may be known as msg4, or RRCSetup message. Correspondingly, the connection setup request message may be known as msg3, or RRCRequest. Those skilled in the art will appreciate that msg1 (e.g., random access preamble) and msg2 (e.g., random access response) may have been previously transmitted by the wireless device and the base station, respectively.

In some embodiments, particularly when received via dedicated signalling, the first message may comprise an indication of the capability filter responsive to the preceding message (e.g., msg3, RRCSetup) transmitted by the wireless device comprising an identifier for the wireless device which is a random value.

The first message may additionally comprise an indication of a hash length to be used in calculating the capability ID (see step 1706 below). The hash length may be explicitly indicated in the first message (e.g., a number of bits, such as 64 or 128), or may be indicated via an index which can be mapped by the wireless device to a particular number of bits.

In further embodiments, the first message may comprise an indication of a collision-avoidance parameter (or an instruction to use a collision-avoidance parameter). The collision-avoidance parameter may be any number or short sequence that the wireless device uses as an additional input to the hash operation, in order to increase the likelihood that the hash value (generated in step 1706) is different. Alternatively or additionally, the collision-avoidance parameter may comprise a change to the order of one or more bits of the input to the hash function (e.g., the first X bits). For example, the order may be reversed or inverted.

In step 1704, the wireless device utilizes the capability filter (or the selected capability filter) to generate a filtered set of capability of the wireless device. The filtered set of capabilities may comprise or correspond to the capability of the wireless device for each requested capability in the capability filter.

In step 1706, the wireless device applies a hash function to the filtered set of capabilities to generate a hash value. If the wireless device has been provided with a collision-avoidance parameter, or instructed to use a collision-avoidance parameter, the hash function may be applied to the collision-avoidance parameter in addition to the filtered set of capabilities, or using the collision-avoidance parameter. Those skilled in the art will appreciate that any suitable hash function may be used for this purpose. Examples of suitable hash functions include, e.g., SHA-1 or SHA-2 algorithms with, e.g., various length, for example 256 bits. If the first length comprises an indication of a hash length, the hash function uses the indicated hash length.

In step 1708, the wireless device transmits the hash value in a second message to the network node or base station.

The hash value may be comprised within a capability identity of the wireless device. The capability identity may thus comprise only the hash value, or some additional identifier, such as a type allocation code (e.g. as specified by an operator). Those skilled in the art will appreciate where references to the Capability ID (or simply "ID") herein refer to this hash-based value.

The message may be transmitted as part of a registration process with a network comprising the base station. For example, in one embodiment, the message is contained within an RRCSetupComplete message (see step 3 in FIG. 5a or 7a, for example). In an alternative embodiment, the message is transmitted to a core network node via the base station, and accordingly may be configured according to a suitable protocol such as the non-access stratum protocol.

The message may further comprise an indication of the filtered set of capabilities of the wireless device. For example, particularly where the base station or a core network node which receives the message does not have knowledge of a mapping between the hash value and a corresponding set of capabilities (or when the base station or core network node has knowledge of the mapping but requests the information to update the mapping or resolve conflicts between identical hash values relating to different sets of capabilities, see below), the wireless device may receive a capability request message from the base station. The capability request may comprise one or more of: an indication of the hash value; and an indication of the capability filter (or an indication of a new capability filter in some embodiments). The wireless device may then respond to that capability request message with a capability response message comprising the hash value (or a new hash value if the capability filter has changed), and an indication of the filtered set of capabilities (e.g., the filtered set of capability information itself). See steps 12 and 13 in FIG. 5b or 7b, for example.

In one embodiment of the disclosure, the wireless device may store the hash value in a database or table, in a manner which associates the hash value with one or more of: an identity of the base station, an identity of a cell served by the base station, and the capability filter. By storing hash values in this way, the wireless device may subsequently use the database or table to identify a suitable hash value upon receiving the capability filter (or identifying the base station or cell), without having to apply the hash function to generate the hash value. This will save on processing in the wireless device. Thus the method may further comprise the steps of: receiving a second broadcast message from a second base station, the second broadcast message comprising an indication of a second capability filter; checking the database for a hash value which is associated with one or more of: an identity of the second base station; an identity of a cell served by the second base station; and the second capability filter; and, responsive to identification of a hash value, transmitting a message to the second base station, the message comprising the identified hash value.

As noted above, use of a hash value in a capability ID means that collision is possible where identical hash values are generated for different combinations of capability filters and filtered sets of capabilities. Particularly where the network (e.g., the network node or a core network node such as the AMF) has stored a mapping between capability IDs and corresponding sets of capabilities, this can lead to the wireless device being configured inappropriately. Thus, the wireless device may receive a connection configuration message from the base station, comprising indications of one or more values for radio parameters by which the connection of the wireless device to the network is to be configured. The values are selected by the network based on the hash value (capability ID) received in the second message, and a stored mapping between that hash value and a corresponding set of capabilities. If the values are inappropriate for the wireless device (e.g., the values assume that the wireless device is more capable than it actually is), this may lead to failure of the connection. Responsive to detection of such a connection failure, the wireless device may transmit a reconfiguration request message to the network node, or a request for re-establishment of the connection. The reconfiguration request message or the request for re-establishment may comprise an indication of the failure (e.g., a reason for the failure, or a mechanism of the failure). The failure may be described as "reconfiguration failure", or alternatively a dedicated failure may be provided, such as "reconfiguration-capability caused", for example.

Figure 18:
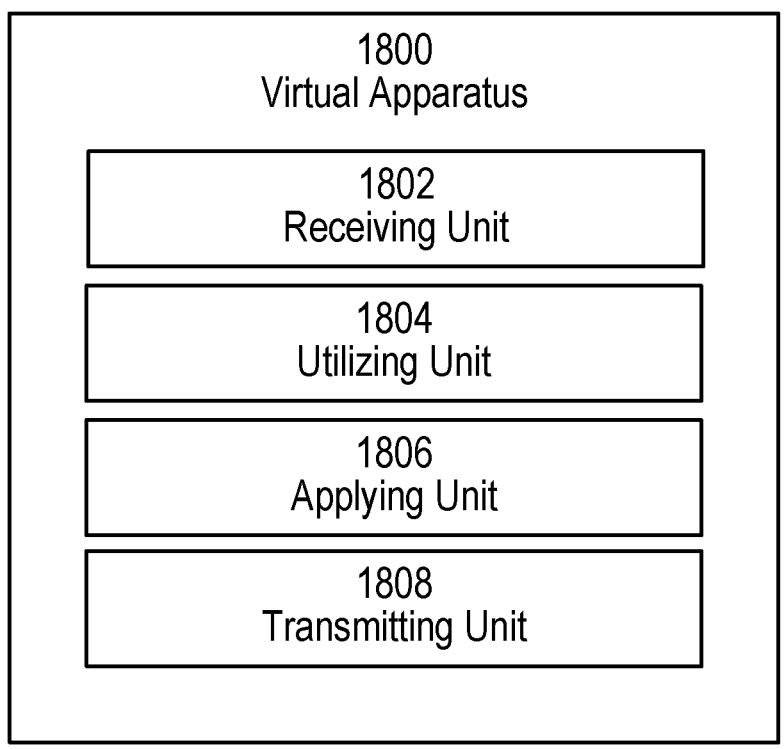
FIG. 18 shows a virtualization apparatus according to embodiments of the disclosure.

FIG. 18 illustrates a schematic block diagram of an apparatus 1800 in a wireless network (for example, the wireless network shown in FIG. 8). The apparatus may be implemented in a wireless device (e.g., wireless device 810 shown in FIG. 8, or UE shown in any of FIGS. 3, 5a/5b, 6, 7a/7b and 9). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, utilizing unit 1804, applying unit 1806, and transmitting unit 1808, and any other suitable units of apparatus 1800 to perform corresponding functions according one or more embodiments of the present disclosure.

As illustrated in FIG. 18, apparatus 1800 includes receiving unit 1802, utilizing unit 1804, applying unit 1806, and transmitting unit 1808. Receiving unit 1802 is configured to receive a first message from a base station, the first message comprising an indication of a capability filter. Utilizing unit 1804 is configured to utilize the capability filter to generate a filtered set of capabilities of the wireless device. Applying unit 1806 is configured to apply a hash function to the filtered set of capabilities to generate a hash value. Transmitting unit 1808 is configured to transmit a second message to the base station, the second message comprising the hash value.

Figure 19:
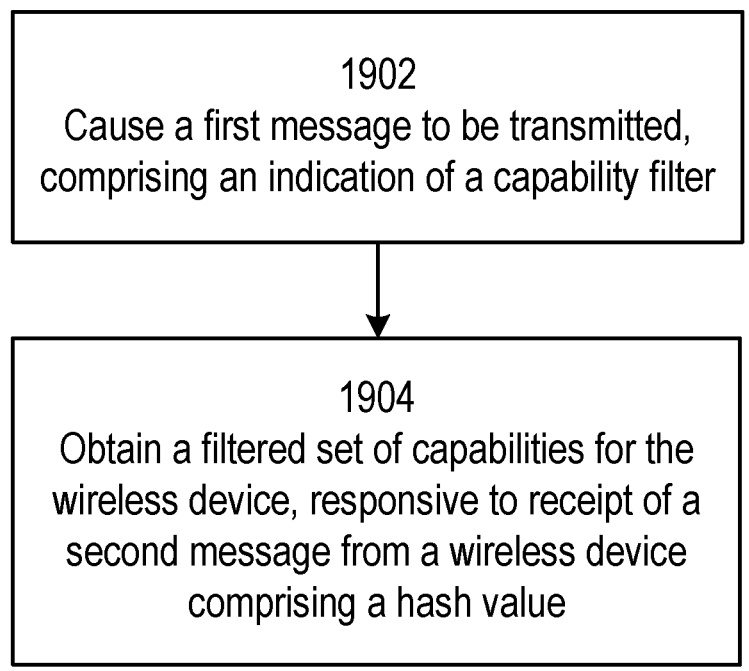
FIG. 19 is a flowchart of a method in a network node according to embodiments of the disclosure.

FIG. 19 depicts a method in accordance with particular embodiments. The method may be performed by a network node, such as a base station (e.g., gNB described above with respect to FIGS. 3, 5a/5b, 6 and 7a/7b, or network node 860 described above with respect to FIG. 8). In some respects, the method may correspond to the gNB signalling in FIGS. 5a/5b and/or 7a/7b, and/or the "network" steps described above with respect to FIG. 6.

The method begins at step 1902, in which the network node causes a first message to be transmitted (e.g., by transmitting the first message itself, or instructing another node to transmit the first message). The first message may be broadcast. Alternatively, the first message may be transmitted via dedicated signalling for the wireless device such as a msg4 or RRCSetup message as described above. The first message comprises an indication of a capability filter to be used by wireless devices (e.g., those wireless devices in the cell or served by the cell) or a particular wireless device (e.g., when dedicated signalling is used) in generating a filtered set of capabilities.

The capability filter may comprise indications of one or more capabilities of the wireless device which are to be reported to the network node. For example, the one or more capabilities may comprise one or more of: radio access technologies which the wireless device is capable of using; frequency bands which the wireless device is capable of using; a maximum bandwidth the wireless device is capable of using; and a maximum number of carriers the wireless device can be configured with. The capability filter may be formatted as a UECapabilityRequestFilterNR information element.

In some embodiments, the first message comprises an indication of a plurality of capability filters. For example, each capability filter of the plurality of capability filters may be associated with or suitable for particular UEs, or particular types of UE (e.g., categories of UE, different UE mobilities, etc).

In one embodiment, the first message may selectively comprise the indication of the capability filter, for example based on a type of identifier used by the wireless device in a preceding message. For example, where the first message is transmitted to a particular wireless device using dedicated signalling, the first message may comprise a response message to a connection setup request message (msg3) transmitted by the particular wireless device. The connection setup request message comprises an indication of an identifier or identity for the wireless device. Where the identifier or identity comprises a TMSI (e.g., a 5G S-TMSI), the network node may assume that a core network node (e.g., AMF) already stores a NAS context for the wireless device. In this instance, the first message may not comprise an indication of the capability filter. Where the identifier or identity comprises a random sequence of bits, the network node may assume that the core network node (e.g., AMF) does not store a NAS context for the wireless device. In this instance, the first message may comprise an indication of the capability filter, so that the capabilities of the wireless device can be obtained.

In further embodiments, the first message may comprise an indication of a collision-avoidance parameter (or an instruction to use a collision-avoidance parameter). The collision-avoidance parameter may be any number or short sequence that the wireless device may use as an additional input to the hash operation, in order to increase the likelihood that the hash value (generated in step 1706 above, or as described below) is different. Alternatively or additionally, the collision-avoidance parameter may comprise a change to the order of one or more bits of the input to the hash function (e.g., the first X bits). For example, the order may be reversed or inverted.

The first message may additionally comprise an indication of a hash length to be used in calculating the capability ID. The hash length may be explicitly indicated in the first message (e.g., a number of bits, such as 64 or 128), or may be indicated via an index which can be mapped by the wireless device to a particular number of bits.

In step 1904, the network node obtains a filtered set of capabilities for a wireless device, responsive to receipt of a message from the wireless device comprising a hash value.

The hash value may be comprised within a capability identity of the wireless device. The capability identity may thus comprise only the hash value, or some additional identifier, such as a type allocation code (e.g. as specified by an operator). Those skilled in the art will appreciate where references to the Capability ID (or simply "ID") herein refer to this hash-based value.

The message may be transmitted by the wireless device as part of a registration process with a network comprising the base station. For example, in one embodiment, the message is contained within an RRCSetupComplete message (see step 3 in FIG. 5*a* or 7*a*, for example). In an alternative embodiment, the message is transmitted to a core network node via the base station, and accordingly may be configured according to a suitable protocol such as the non-access stratum protocol.

The network node may obtain the filtered set of capabilities in a variety of different ways.

For example, in one embodiment (e.g., where the message is transmitted using NAS signaling), the hash value is provided to a core network node (e.g., the AMF, see step 4 or step 8 of FIG. 5*a*, step NW-2 of FIG. 6, etc). The core network node determines whether it has knowledge of the mapping of the hash value to a set of corresponding wireless device capabilities (e.g., through previous signaling with other wireless devices).

If the core network node has knowledge of the mapping, the network node may receive an indication of the filtered set of capabilities from the core network node in a message (e.g., see step 9 in FIG. 5*a*, or step NW-4b in FIG. 6). That message may further comprise the hash value or an indication thereof.

If the core network node does not have knowledge of the mapping, the network node may receive a message from the core network node comprising the hash value or an indication thereof (e.g., see step 9 in FIG. 5*a*, or step NW-5a in FIG. 6). The message may further comprise an implicit or explicit instruction to the network node to conduct a capability enquiry procedure with the wireless device (see, e.g., FIG. 1, and/or steps 12 and 13 of FIG. 5*b*, and/or steps 5b and 6a of FIG. 6), particularly if the network node does not itself have knowledge of the mapping between the hash value and the filtered set of capabilities. Thus the network node transmits a capability request message to the wireless device. The capability request message may comprise one or more of: the hash value; and an indication of a capability filter (either the transmitted capability filter or a new capability filter if desired). The wireless device responds with a capability response message, comprising the hash value (Capability ID) and an indication of the filtered set of capabilities (such as the capability information itself). Thereafter, the network node may inform the core network node of the filtered set of capabilities and the corresponding hash value, such that the core network node can update the UE context and/or store the mapping between the hash value and the filtered set of capabilities for future use.

Note that, if the core network node does not have knowledge of the mapping between the hash value and the filtered set of capabilities, but the network node does, the network node may utilize its own knowledge of the mapping to obtain the filtered set of capabilities upon receipt of the hash value from the core network node. The network node may also forward the filtered set of capabilities (and the hash value) to the core network node, such that the core network node can update the UE context and/or store the mapping between the hash value and the filtered set of capabilities for future use.

In an alternative embodiment, the network node itself may receive the message transmitted by the wireless device (e.g., via RRC signaling) and comprising the hash value (see FIG. 7*a*/7*b*). Thus the network node gains knowledge of the hash value directly from receipt of the message from the wireless device, rather than from a core network node such as the AMF. The network node itself may then determine whether it has knowledge of the mapping between the hash value and a corresponding set of capabilities. If the network node does not have knowledge of the mapping, it may request information from the core network node (e.g., the AMF) or indeed the wireless device (e.g., see steps 12 and 13 of FIG. 7*b*). Thus the network node transmits a request message to the core network node or the wireless device. The request message may comprise one or more of: the hash value; and an indication of a capability filter (either the transmitted capability filter or a new capability filter if desired). If the core network node has knowledge of the mapping, it can respond with a response message comprising the hash value and the corresponding set of capabilities; if the core network node does not have knowledge of the mapping, the response message may comprise the hash value and an implicit or explicit instruction to conduct a capability enquiry with the wireless device to obtain the filtered set of capabilities. The wireless device responds with a capability response message, comprising the hash value (Capability ID) and an indication of the filtered set of capabilities (such as the capability information itself). Thereafter, the network node may inform the core network node of the filtered set of capabilities and the corresponding hash value, such that the core network node can update the UE context and/or store the mapping between the hash value and the filtered set of capabilities for future use. Thus the network node transmits a capability request message to the wireless device. The capability request message may comprise one or more of: the hash value; and an indication of a capability filter (either the transmitted capability filter or a new capability filter if desired). The wireless device responds with a capability response message, comprising the hash value (Capability ID) and an indication of the filtered set of capabilities (such as the capability information itself). Thereafter, the network node may inform the core network node of the filtered set of capabilities and the corresponding hash value, such that the core network node can update the UE context and/or store the mapping between the hash value and the filtered set of capabilities for future use.

As noted above, use of a hash value in a capability ID means that collision is possible where identical hash values are generated for different combinations of capability filters and filtered sets of capabilities. Particularly where the network (e.g., the base station or a core network node such as the AMF) has stored a mapping between capability IDs and corresponding sets of capabilities, this can lead to the wireless device being configured inappropriately.

In a first step, the network node may detect the presence of a collision between multiple combinations of sets of capabilities and capability filters, and corresponding identical hash values.

In one embodiment, the network node may cause transmission of a connection configuration message to the wireless device, comprising indications of one or more values for radio parameters by which the connection of the wireless device to the network is to be configured. The values are selected by the network based on the hash value (capability ID) transmitted in the second message, and a stored mapping between that hash value and a corresponding set of capabilities. If the values are inappropriate for the wireless device (e.g., the values assume that the wireless device is more capable than it actually is), this may lead to failure of the connection. Responsive to detection of such a connection failure, the wireless device may transmit a reconfiguration request message to the base station, or a request for re-establishment of the connection. The reconfiguration request message or the request for re-establishment may comprise an indication of the failure (e.g., a reason for the failure, or a mechanism of the failure). The failure may be described as "reconfiguration failure", or alternatively a dedicated failure may be provided, such as "reconfiguration-capability caused", for example.

Other misconfigurations of the connection for the wireless device may not result in failure of the connection, however. Alternative embodiments for detecting the presence of a collision include requesting a filtered set of capabilities for the wireless device regardless of whether or not a mapping for the hash value is already stored by the network node or the core network node. The request may be initiated by the network node or by the core network node. The capability information may be requested regularly or irregularly. For example, the request may be contained within the first message, or via a separate message. The wireless device then provides capability information to the network node and the network can compare the stored capability information for the capability ID with the most-recent capability information received from the wireless for that capability ID. If there is a match of capability information, then no collision is detected, whereas if there is a mismatch of capability information between the stored information (for the same Hash ID) and the received information, then a collision is detected. The collision may be detected by comparing "bitwise" the capability container stored in the core network node (e.g., AMF) or the network node. Alternatively, the collision may be detected by parsing the capability container and detecting corresponding filtered sets of capabilities.

The algorithm for requesting capability information can be made in a number of various ways. It can for example be run differently on different IDs and if there is no detection of collisions the request cycle can be extended, whereas if there is a detected collision, the algorithm will be run continuously as there would be no way of otherwise knowing what capabilities a UE has. The frequency with which a particular capability ID or hash value is checked may vary as a function of the frequency of use of that capability ID or hash. For example, if an ID is used relatively often, it can be checked relatively often (and vice versa).

In a second step, once a collision between multiple stored identical hash values or capability IDs has been detected, the network node may take one or more actions to remediate the collision.

For example, in one embodiment the inputs to the hash algorithm may be altered. The inputs may be altered by changing the capability filter for one or more of the wireless devices involved in the colliding capability IDs. However, changing the filter may not be desired, as operations actually do require certain information. Alternatively or additionally, the inputs to the hash algorithm applied by the wireless device may be altered by allowing the hash value to be a function of an additional input parameter, or collision-avoidance parameter (i.e. in addition to the filtered set of capabilities) such that collisions between certain capability information and filter combinations no longer occur.

The collision-avoidance parameter may be any number or short sequence that the wireless device will use as an additional input to the hash operation. Alternatively or additionally, the order of one or more bits of the input (e.g., the first X bits) may be altered in a defined way (e.g., reversed, or inverted). This can also be commanded by the collision-avoidance parameter, which may be optionally sent and possibly also only sent when there is a need to separate collisions of two common UEs together with a common filter. The collision-avoidance parameter may be signaled to the wireless device in the first message or a different message. For example, the network node may provide the collision-avoidance parameter to broadcast filter information, or to dedicated signaling (e.g., msg4, or a request for capability information).

If the collision-avoidance parameter is used, it may also be stored together with the filtered set of capabilities and the corresponding capability ID or hash value.

According to a further alternative aspect of the present disclosure, a collision is detected and then two different capability containers are stored together with the ID in a mapping table. Whenever this capability ID is used again, the AMF will provide both information containers and possibly an explicit indication to the gNB that the capability ID is not unique. Then, the UE will need to re-request explicit information from UEs that generate the capability ID that is similar to another generated ID.

According to another aspect of the present disclosure, the storage of mapping between capability ID and capability information in the network (in the core network node (e.g., AMF) or the network node (e.g., base station)) is flushed regularly (e.g., deleted). The reason for this is that even though capability ID collisions may be detected if reconfigurations fail, they will not be detected otherwise. This may result in that advanced UEs that are capable of, e.g., very high rates, may never be configured with such high rates if they have capability ID that is the same as a less advanced UE. If the mapping tables are flushed from time to time, or flushed in sequence, in particular for IDs that are commonly signaled, then it is much less likely that such an ID problem will occur. A random or repetitive request of capability information also for IDs for which the nodes have already stored information may also reveal a collision of hash and can be done, e.g., regularly or irregularly and also dependent on ID type used. If an ID is used often, it can be flushed more often.

In one embodiment, the flushing of capability IDs and corresponding capability information from the mapping table may occur in conjunction with a change to the additional parameter Hash-coil-input used as an input to the hash operation. For example, the change to the additional parameter may happen simultaneously with, or as a consequence of, the flushing of a capability ID from the mapping table. Thus, upon detection of a collision between identical capability IDs but non-identical capability information, one or both of the colliding UEs may be instructed by the gNB to use a different additional parameter Hash-coil-input in the hash operation used to calculate the capability IDs. In this way, once a collision has occurred between identical capability IDs, similar collisions are made much less likely through the change to the additional parameter.

In a further embodiment, an indication of the length of the hash used to calculate the capability ID may be communicated to UEs. For example, the indication may be communicated by the gNB to one or more UEs via broadcast (e.g., system information), or as dedicated signaling in msg4, e.g., in the RRC Connection Setup message or a UE capability enquiry message (UECapabilityEnquiry (in 3GPP TS 38.331, v15.4.0). If the information is provided as broadcast information it may apply for all UEs in the cell, unless also signaled via dedicated messages such as msg4 or the UE capability enquiry message.

By signaling the length of the hash to UEs, this embodiment enables dynamic control of the hash length by the network. For example, upon detection of one or more collisions between identical capability IDs and non-identical capability information in a stored mapping table (either in the gNB or a core network node such as AMF), an indication of an increased hash length may be signaled to one or more UEs to reduce the likelihood of collisions in future. For example, the hash length may be changed or increased upon detecting a collision, or a certain number of collisions within a given time window.

Thus in one embodiment, the gNB signals to the UE indications of one or more of the following: capability filter F1, HASH-algorithm, HASH-length, HASH-coil-input. The UE may use these one or more as inputs when calculating the HASH ID as per the following (in the following example they are all used as input, together with the UE capability information):
Hash ID (UE)=f (UE1 capability information, capability filter F1, Hash algorithm including Hash-length, Hash-coll-input)

If one or more collisions occur, the network can instruct the UE to switch to another hash length. For example, the UE may be instructed to change from calculating a 64-bit capability ID to a 128-bit capability ID. By extending the length of the capability ID that is calculated, the collision probability is decreased.

In one embodiment, the capability mapping table may be flushed entirely upon a change to the capability ID length, such that there is no mix of different capability ID lengths in the mapping table. In alternative embodiments, however, it may not be necessary to have a consistent capability ID length, with different lengths being allowed. This may be particularly convenient, for example, if only certain UEs are asked to provide capability IDs using different hash lengths (e.g., via dedicated signaling).

Figure 20:
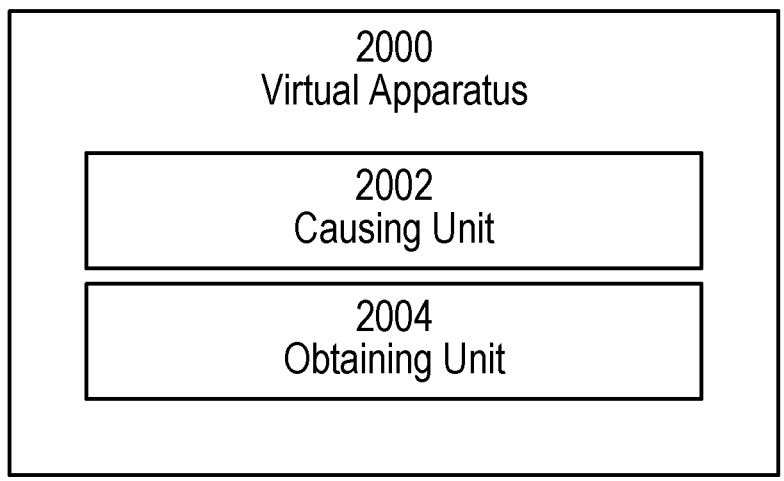
FIG. 20 shows a virtualization apparatus according to embodiments of the disclosure.

FIG. 20 illustrates a schematic block diagram of an apparatus 2000 in a wireless network (for example, the wireless network shown in FIG. 8). The apparatus may be implemented in a network node (e.g., network node 860 shown in FIG. 8, and/or gNB shown in FIGS. 3, 5a/5b, 6 and 7a/7b). Apparatus 2000 is operable to carry out the example method described with reference to FIG. 19 and possibly any other processes or methods disclosed herein. It is also to be understood that the method of FIG. 19 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause causing unit 2002 and obtaining unit, and any other suitable units of apparatus 2000 to perform corresponding functions according one or more embodiments of the present disclosure.

As illustrated in FIG. 20, apparatus 2000 includes causing unit 2002 and obtaining unit. Causing unit 2002 is configured to cause a first message to be transmitted, the first message comprising an indication of a capability filter to be used by wireless devices in generating a filtered set of capabilities. Obtaining unit 2004 is configured to obtain, responsive to receipt of a second message from a wireless device, the message comprising a hash value, a filtered set of capabilities for the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure:

Group A Embodiments

1. A method performed by a wireless device for providing capability information, the method comprising:
    receiving a first message from a base station, the first message comprising an indication of a capability filter;
    utilizing the capability filter to generate a filtered set of capabilities of the wireless device;
    applying a hash function to the filtered set of capabilities to generate a hash value; and
    transmitting a second message to the base station, the second message comprising the hash value.
2. The method of embodiment 1, wherein the first message is a broadcast message.
3. The method of embodiment 1 or 2, wherein the hash value is comprised within a capability identity of the wireless device.
4. The method of embodiment 3, wherein the capability identity comprises solely the hash value.
5. The method of embodiment 3, wherein the capability identity further comprises an additional identifier.
6. The method of embodiment 5, wherein the additional identifier comprises a type allocation code.
7. The method according to any one of the preceding embodiments, wherein the second message is transmitted as part of a registration process with a network comprising the base station.
8. The method according to embodiment 7, wherein the second message is contained within an RRCSetupComplete message.
9. The method according to any one of the preceding embodiments, wherein the second message is transmitted to a core network node via the base station.

10. The method according to embodiment 9, wherein the second message is configured according to a non-access stratum protocol.
11. The method according to any one of the preceding embodiments, wherein the second message further comprises an indication of the filtered set of capabilities of the wireless device.
12. The method according to embodiment 11, wherein the second message further comprises the indication of the filtered set of capabilities of the wireless device responsive to receipt of a request message from the base station.
13. The method according to any one of the preceding embodiments, wherein the capability filter comprises indications of one or more capabilities of the wireless device which are to be reported to the base station.
14. The method according to embodiment 13, wherein the one or more capabilities comprises one or more of: radio access technologies which the wireless device is capable of using; frequency bands which the wireless device is capable of using; a maximum bandwidth the wireless device is capable of using; and a maximum number of carriers the wireless device can be configured with.
15. The method according to any one of the preceding embodiments, wherein the capability filter is formatted as a UECapabilityRequestFilterNR information element.
16. The method according to any one of the preceding embodiments, wherein the first message comprises an indication of a plurality of capability filters.
17. The method according to embodiment 16, further comprising:
identifying a capability filter of the plurality of capability filters which is associated with the wireless device (e.g., based on a type of wireless device); and
utilizing the identified capability filter to generate the filtered set of capabilities of the wireless device.
18. The method according to any one of the preceding embodiments, further comprising storing the hash value in a database, the hash value being stored in a manner which associates the hash value with one or more of: an identity of the base station, an identity of a cell served by the base station, and the capability filter.
19. The method according to embodiment 18, further comprising:
receiving a further first message from a second base station, the further first message comprising an indication of a second capability filter;
checking the database for a hash value which is associated with one or more of: an identity of the second base station; an identity of a cell served by the second base station; and the second capability filter; and
responsive to identification of a hash value, transmitting a further second message to the second base station, the message comprising the identified hash value.
20. The method according to any one of embodiments 1 and 3-19, wherein the first message is a dedicated message for the wireless device.
21. The method according to embodiment 20, wherein the first message comprises a response message to a connection setup request message transmitted by the wireless device.
22. The method according to embodiment 21, wherein the connection setup request message comprises an identifier value for the wireless device comprising a random sequence.
23. The method according to any one of the preceding embodiments, wherein the hash function is applied to the filtered set of capabilities and a collision-avoidance parameter to generate the hash value.
24. The method according to embodiment 23, wherein the collision-avoidance parameter comprises one or more of: an instruction to alter an input to the hash function to reduce the likelihood of collisions; and a bit sequence.
25. The method according to embodiment 23 or 24, wherein the first message comprises an indication of the collision-avoidance parameter.
26. The method according to any one of the preceding embodiments, further comprising:
receiving a connection configuration message from the base station, the connection configuration message comprising indications of one or more values for radio parameters based on the hash value; and
responsive to detection of failure of a connection configuration based on the one or more values for radio parameters, transmitting a reconfiguration request message to the base station.
27. The method according to embodiment 26, wherein the reconfiguration request message comprises an indication of the failure.
28. The method according to any one of the preceding embodiments, wherein the first message comprises an indication of a length of the hash function.
29. The method of any of the previous embodiments, further comprising:
providing user data; and
forwarding the user data to a host computer via a transmission to the base station.

Group B Embodiments

30. A method performed by a base station for obtaining capability information of a wireless device, the method comprising:
causing a first message to be transmitted, the first message comprising an indication of a capability filter to be used by one or more wireless devices in generating a filtered set of capabilities; and
responsive to receipt of a second message from a wireless device, the second message comprising a hash value, obtaining a filtered set of capabilities for the wireless device.
31. The method of embodiment 30, wherein the first message is a broadcast message, and is caused to be broadcast by the base station.
32. The method of embodiment 30 or 31, wherein the hash value is comprised within a capability identity of the wireless device.
33. The method of embodiment 32, wherein the capability identity comprises solely the hash value.
34. The method of embodiment 32, wherein the capability identity further comprises an additional identifier.
35. The method of embodiment 34, wherein the additional identifier comprises a type allocation code.
36. The method according to any one of embodiments 30 to 35, wherein the second message is received as part of a registration process with a network comprising the base station.

37. The method according to embodiment 36, wherein the second message is contained within an RRCSetupComplete message.
38. The method according to any one of embodiments 30 to 37, wherein obtaining the filtered set of capabilities for the wireless device comprises:
   checking a database of stored hash values and associated filtered sets of capabilities for the particular hash value in the second message; and
   responsive to detection of the particular hash value in the database, obtaining the filtered set of capabilities associated with the particular hash value in the database.
39. The method according to embodiment 38, further comprising:
   updating the database by causing transmission of a request message to a wireless device associated with a stored hash value, the request message requesting a filtered set of capabilities for the wireless device.
40. The method according to embodiment 39, wherein the database is updated periodically.
41. The method according to any one of embodiments 39 to 40, further comprising:
   wherein the database is updated responsive to receipt of a reconfiguration request message from the wireless device comprising an indication of failure of a connection configuration.
42. The method according to any one of embodiments 38 to 41, further comprising flushing stored hash values and associated filtered sets of capabilities from the database.
43. The method according to embodiment 42, wherein flushing is performed periodically.
44. The method according to embodiment 42, wherein stored hash values and associated filtered sets of capabilities are flushed from the database a defined period of time after their entry into the database.
45. The method according to any one of embodiments 42 to 44, wherein the hash value is obtained by applying a hash function to the filtered set of capabilities and a collision-avoidance parameter, wherein the first message comprises an indication of the collision-avoidance parameter, and further comprising causing transmission of an indication of a different value for the collision-avoidance parameter upon flushing of the stored hash values and associated filtered sets of capabilities from the database.
46. The method according to any one of embodiments 30 to 37, wherein obtaining the filtered set of capabilities for the wireless device comprises:
   forwarding the hash value to a core network node; and
   receiving the filtered set of capabilities for the wireless device from the core network node.
47. The method according to any one of embodiments 30 to 37, wherein obtaining the filtered set of capabilities for the wireless device comprises:
   forwarding the hash value to a core network node;
   receiving an instruction from the core network node to request the filtered set of capabilities from the wireless device;
   causing transmission of a request message to the wireless device, comprising a request to provide the filtered set of capabilities; and
   obtaining the filtered set of capabilities from a response message transmitted by the wireless device.
48. The method according to embodiment 47, further comprising:
   forwarding the filtered set of capabilities to the core network node, to enable storage in the core network node of an association between the filtered set of capabilities and the hash value.
49. The method according to any one of embodiments 46 to 48, wherein the core network node comprises an Access and Mobility Management Function, AMF.
50. The method according to any one of embodiments 46 to 49, wherein the hash value is forwarded to the core network node without decoding the second message.
51. The method according to embodiment 50, wherein the second message is configured according to a non-access stratum protocol.
52. The method according to any one of embodiments 30 to 51, wherein the capability filter comprises indications of one or more capabilities of the wireless device which are to be reported to the base station.
53. The method according to embodiment 52, wherein the one or more capabilities comprises one or more of: radio access technologies which the wireless device is capable of using; frequency bands which the wireless device is capable of using; a maximum bandwidth the wireless device is capable of using; and a maximum number of carriers the wireless device can be configured with.
54. The method according to any one of embodiments 30 to 53, wherein the capability filter is formatted as a UECapabilityRequestFilterNR information element.
55. The method according to any one of embodiments 30 to 54, wherein the first message comprises an indication of a plurality of capability filters.
56. The method according to embodiment 55, wherein each of the plurality of capability filters is associated with one or more respective types of wireless device.
57. The method according to any of embodiments 30 and 32-56, wherein the first message comprises a dedicated message for the wireless device.
58. The method according to embodiment 57, wherein the first message comprises a response message to a connection setup request message transmitted by the wireless device.
59. The method according to embodiment 58, wherein the first message comprises the indication of the capability filter responsive to a determination that the connection setup request message comprises an identifier value for the wireless device comprising a random sequence.
60. The method according to any one of embodiments 30 to 59, wherein the hash value is obtained by applying a hash function to the filtered set of capabilities and a collision-avoidance parameter.
61. The method according to embodiment 60, wherein the collision-avoidance parameter comprises one or more of: an instruction to alter an input to the hash function to reduce the likelihood of collisions; and a bit sequence.
62. The method according to embodiment 60 or 61, wherein the first message comprises an indication of the collision-avoidance parameter.
63. The method according to any one of embodiments 30 to 62, wherein the first message further comprises an indication of a length of the hash function.
64. The method according to embodiment 63, wherein obtaining the filtered set of capabilities comprises checking a database of stored hash values and associated filtered sets of capabilities for the particular hash value in the second message, and wherein the length of the hash function depends on a number of collisions between identical stored hash values and non-identical associated filtered sets of capabilities.

65. The method according to any one of embodiments 30 to 64, further comprising:
    obtaining user data; and
    forwarding the user data to a host computer or a wireless device.

Group C Embodiments

66. A wireless device for providing capability information, the wireless device comprising:
    processing circuitry configured to perform any of the steps of any of the Group A embodiments; and
    power supply circuitry configured to supply power to the wireless device.
67. A base station for obtaining capability information, the base station comprising:
    processing circuitry configured to perform any of the steps of any of the Group B embodiments;
    power supply circuitry configured to supply power to the base station.
68. A user equipment (UE) for providing capability information, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
69. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.
70. The communication system of the previous embodiment further including the base station.
71. The communication system of the previous 2 embodiments, further including the UE, wherein the UE is configured to communicate with the base station.
72. The communication system of the previous 3 embodiments, wherein:
    the processing circuitry of the host computer is configured to execute a host application, thereby providing the user data; and
    the UE comprises processing circuitry configured to execute a client application associated with the host application.
73. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.
74. The method of the previous embodiment, further comprising, at the base station, transmitting the user data.
75. The method of the previous 2 embodiments, wherein the user data is provided at the host computer by executing a host application, the method further comprising, at the UE, executing a client application associated with the host application.
76. A user equipment (UE) configured to communicate with a base station, the UE comprising a radio interface and processing circuitry configured to performs the of the previous 3 embodiments.
77. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
78. The communication system of the previous embodiment, wherein the cellular network further includes a base station configured to communicate with the UE.
79. The communication system of the previous 2 embodiments, wherein:
    the processing circuitry of the host computer is configured to execute a host application, thereby providing the user data; and
    the UE's processing circuitry is configured to execute a client application associated with the host application.
80. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.
81. The method of the previous embodiment, further comprising at the UE, receiving the user data from the base station.
82. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
83. The communication system of the previous embodiment, further including the UE.

84. The communication system of the previous 2 embodiments, further including the base station, wherein the base station comprises a radio interface configured to communicate with the UE and a communication interface configured to forward to the host computer the user data carried by a transmission from the UE to the base station.
85. The communication system of the previous 3 embodiments, wherein:
    the processing circuitry of the host computer is configured to execute a host application; and
    the UE's processing circuitry is configured to execute a client application associated with the host application, thereby providing the user data.
86. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
87. A method implemented in a communication system including a host computer, a base station and a user equipment (UE), the method comprising:
    at the host computer, receiving user data transmitted to the base station from the UE, wherein the UE performs any of the steps of any of the Group A embodiments.
88. The method of the previous embodiment, further comprising, at the UE, providing the user data to the base station.
89. The method of the previous 2 embodiments, further comprising:
    at the UE, executing a client application, thereby providing the user data to be transmitted; and
    at the host computer, executing a host application associated with the client application.
90. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
91. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
92. The communication system of the previous embodiment further including the base station.
93. The communication system of the previous 2 embodiments, further including the UE, wherein the UE is configured to communicate with the base station.
94. The communication system of the previous 3 embodiments, wherein:
    the processing circuitry of the host computer is configured to execute a host application;
    the UE is configured to execute a client application associated with the host application, thereby providing the user data to be received by the host computer.
95. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
96. The method of the previous embodiment, further comprising at the base station, receiving the user data from the UE.
97. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
AMF Access and Mobility Management Function
CN Core Network
NAS Non-Access Stratum
NG Next Generation
PEI Permanent Equipment Identifier
RACS Radio Capability Signaling
TAC Type Allocation Code
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wideband CDMA
WLAN Wide Local Area Network

The invention claimed is:

1. A method performed by a wireless device for providing capability information, the method comprising:
receiving a first message from a base station, the first message comprising an indication of a capability filter;
utilizing the capability filter to generate a filtered set of capabilities of the wireless device;
applying a hash function to the filtered set of capabilities to generate a hash value;
transmitting a second message to the base station, the second message comprising the hash value;
receiving a connection configuration message from the base station, the connection configuration message comprising indications of one or more values for radio parameters based on the hash value; and
responsive to detection of failure of a connection configuration based on the one or more values for radio parameters, transmitting a reconfiguration request re-establishment message to the base station.

2. The method of claim 1, wherein the hash value is comprised within a capability identity of the wireless device.

3. The method of claim 2, wherein the capability identity comprises solely the hash value.

4. The method of claim 2, wherein the capability identity further comprises an additional identifier, the additional identifier comprises a type allocation code.

5. The method of claim 1, wherein the second message further comprises an indication of the filtered set of capabilities of the wireless device.

6. The method of claim 1, wherein the capability filter comprises indications of one or more capabilities of the wireless device which are to be reported to the base station.

7. The method of claim 1, further comprising: storing the hash value in a database, the hash value being stored in a manner which associates the hash value with one or more of: an identity of the base station, an identity of a cell served by the base station, and the capability filter.

8. The method of claim 7, further comprising:
receiving a further first message from a second base station, the further first message comprising an indication of a second capability filter;
checking the database for a hash value which is associated with one or more of: an identity of the second base station, an identity of a cell served by the second base station, and the second capability filter; and responsive to identification of a hash value, transmitting a further second message to the second base station, the message comprising the identified hash value.

9. The method of claim 1, wherein the first message is a broadcast message or a dedicated message for the wireless device and further comprises an indication of a collision-avoidance parameter.

10. The method of claim 1, wherein the hash function is applied to the filtered set of capabilities and the collision-avoidance parameter to generate the hash value.

11. The method of claim 1, wherein the first message comprises an indication of a length of the hash function.

12. A method performed by a base station for obtaining capability information of a wireless device, the method comprising:
    causing a first message to be transmitted, the first message comprising an indication of a capability filter to be used by one or more wireless devices in generating a filtered set of capabilities;
    responsive to receipt of a second message from a wireless device, the second message comprising a hash value, obtaining a filtered set of capabilities for the wireless device;
    transmitting a connection configuration message to the wireless device, the connection configuration message comprising indications of one or more values for radio parameters based on the hash value; and
    receiving a reconfiguration request re-establishment message in response to the wireless device detecting a failure of a connection configuration based on the one or more values for radio parameters.

13. The method of claim 12, wherein obtaining the filtered set of capabilities for the wireless device comprises:
    checking a database of stored hash values and associated filtered sets of capabilities for the particular hash value in the second message; and
    responsive to detection of the particular hash value in the database, obtaining the filtered set of capabilities associated with the particular hash value in the database.

14. The method of claim 13, further comprising:
    updating the database by causing transmission of a request message to a wireless device associated with a stored hash value, the request message requesting a filtered set of capabilities for the wireless device.

15. The method of claim 13, further comprising:
    flushing stored hash values and associated filtered sets of capabilities from the database.

16. The method of claim 15, wherein the hash value is obtained by applying a hash function to the filtered set of capabilities and a collision-avoidance parameter, wherein the first message comprises an indication of the collision-avoidance parameter, and further comprising causing transmission of an indication of a different value for the collision-avoidance parameter upon flushing of the stored hash values and associated filtered sets of capabilities from the database.

17. The method of claim 12, wherein obtaining the filtered set of capabilities for the wireless device comprises:
    forwarding the hash value to a core network node; and
    receiving the filtered set of capabilities for the wireless device from the core network node.

18. The method of claim 12, wherein obtaining the filtered set of capabilities for the wireless device comprises:
    forwarding the hash value to a core network node;
    receiving an instruction from the core network node to request the filtered set of capabilities from the wireless device;
    causing transmission of a request message to the wireless device, comprising a request to provide the filtered set of capabilities; and
    obtaining the filtered set of capabilities from a response message transmitted by the wireless device.

19. A base station for obtaining capability information, the base station comprising:
    a processing circuitry configured to cause the base station to:
        cause a first message to be transmitted, the first message comprising an indication of a capability filter to be used by one or more wireless devices in generating a filtered set of capabilities;
        responsive to receipt of a second message from a wireless device, the second message comprising a hash value, obtain a filtered set of capabilities for the wireless device;
        transmit a connection configuration message to the wireless device, the connection configuration message comprising indications of one or more values for radio parameters based on the hash value; and
        receive a reconfiguration request re-establishment message in response to the wireless device detecting a failure of a connection configuration based on the one or more values for radio parameters; and
    a power supply circuitry configured to supply power to the base station.

* * * * *